US012529926B2

(12) United States Patent
Ide

(10) Patent No.: US 12,529,926 B2
(45) Date of Patent: Jan. 20, 2026

(54) VIRTUAL IMAGE DISPLAY DEVICE AND HEAD-MOUNTED DISPLAY APPARATUS

(71) Applicant: SEIKO EPSON CORPORATION, Tokyo (JP)

(72) Inventor: Mitsutaka Ide, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 228 days.

(21) Appl. No.: 18/532,145

(22) Filed: Dec. 7, 2023

(65) Prior Publication Data
US 2024/0192541 A1 Jun. 13, 2024

(30) Foreign Application Priority Data

Dec. 8, 2022 (JP) ................... 2022-196173

(51) Int. Cl.
*G02F 1/1335* (2006.01)
*G02B 27/01* (2006.01)

(52) U.S. Cl.
CPC ..... *G02F 1/133512* (2013.01); *G02B 27/0172* (2013.01); *G02F 1/133526* (2013.01); *G02F 1/133528* (2013.01); *G02B 2027/0132* (2013.01)

(58) Field of Classification Search
CPC ......... G02F 1/133528; G02F 1/133531; G02F 1/133512; G02F 1/133509; B29D 11/00644; B32B 2307/42; G02B 5/3025; G02B 27/0172; G02B 27/01; G02B 27/0101; G02B 2027/0132; G02B 2027/0178; H01L 29/78633; H01L 51/5284

See application file for complete search history.

(56) References Cited

U.S. PATENT DOCUMENTS

| | | | | |
|---|---|---|---|---|
| 2004/0246434 A1* | 12/2004 | Ohashi | ................. | G09G 3/3406 349/199 |
| 2005/0248736 A1* | 11/2005 | Itoh | ...................... | G03B 21/006 353/102 |
| 2011/0228179 A1* | 9/2011 | Sugiyama | ............ | H04N 13/337 349/9 |
| 2018/0231837 A1* | 8/2018 | Fukuoka | .......... | G02F 1/133528 |
| 2021/0333456 A1* | 10/2021 | Ishioka | .................... | G02B 5/09 |

FOREIGN PATENT DOCUMENTS

WO 2016/056298 A1 4/2016

* cited by examiner

*Primary Examiner* — Jonathan Y Jung
(74) *Attorney, Agent, or Firm* — Oliff PLC

(57) ABSTRACT

A virtual image display device includes a light modulating element including a liquid crystal pixel and a light transmitting region, a light shielding member being arranged on an external side of the light modulating element, a backlight being arranged between the light modulating element and the light shielding member and being configured to irradiate the liquid crystal pixel, a polarizing plate configured to limit external light that passes through the light transmitting region of the light modulating element and image light that is emitted from the liquid crystal pixel, to polarized light, and cause the light to pass therethrough, an image selection conversion member configured to selectively change a polarization direction of the image light emitted from the polarizing plate, and a polarization separation lens element being arranged on the face side of the image selection conversion member.

12 Claims, 13 Drawing Sheets

VIRTUAL IMAGE DISPLAY DEVICE AND HEAD-MOUNTED DISPLAY APPARATUS

The present application is based on, and claims priority from JP Application Serial Number 2022-196173, filed Dec. 8, 2022, the disclosure of which is hereby incorporated by reference herein in its entirety.

BACKGROUND

1. Technical Field

The present disclosure relates to a virtual image display device and a head-mounted display apparatus that enable observation of a virtual image, and more particularly to a virtual image display device and the like of a see-through type that enable visual recognition of an external image.

2. Related Art

As a virtual image display device of a see-through type that enables visual recognition of externals, there has been publicly known a virtual image display device including a liquid crystal panel that includes an image display region and a transparent display region formed to surround the image display region, and a light guiding plate that guides backlight light entering an end portion from a light source, wherein the light guiding plate includes a light emitting region in which the image display region of the liquid crystal panel is irradiated with the backlight light and a light transmitting region that transmits environmental light (International Publication No. WO 2016/056298). The display device is configured so that the environmental light reaches an observer through the light transmitting region of the light guiding plate and the transparent display region of the liquid crystal panel while the environmental light, which is transmitted through the light emitting region of the light guiding plate and the image display region of the liquid crystal panel, reaches the observer for a period during which the image display region is not irradiated with the backlight light. With this configuration, see-through display obtained by overlapping image light and environmental light with each other is achieved.

However, in the device described above, the light emitting region of the light guiding plate is subjected to treatment such as formation of dots and application of a scattering agent, and the environmental light passing through the image display region of the liquid crystal panel also passes through the light emitting region subjected to the treatment. As a result, near a center of a visual field corresponding to the image display region, a see-through transmittance is reduced. In order to achieve see-through display with a high see-through transmittance near the center of the visual field, an optical system with a high see-through transmittance or the like is additionally required, which leads to the size increase.

SUMMARY

According to one aspect of the present disclosure, a virtual image display device includes a light modulating element including a liquid crystal pixel and a first light transmitting region having light transmittance, a light shielding member being arranged on an external side of the light modulating element and being configured to suppress incidence of external light on the liquid crystal pixel, a backlight being arranged between the light shielding member and the light modulating element and being configured to irradiate the liquid crystal pixel with light of three colors in a time-division manner, a polarizing plate configured to limit external light that passes through the first light transmitting region of the light modulating element and image light that is emitted from the liquid crystal pixel, to polarized light in a first polarization direction, and transmit the light, an image selection conversion member configured to selectively change a polarization direction of the image light emitted from the polarizing plate, and a polarization separation lens element being arranged on the face side of the image selection conversion member and having refractive power acting on polarization of the image light.

DESCRIPTION OF EMBODIMENTS

First Exemplary Embodiment

With reference to FIGS. 1 to 10, a virtual image display device and the like according to a first exemplary embodiment of the present disclosure is described below.

Figure 1:
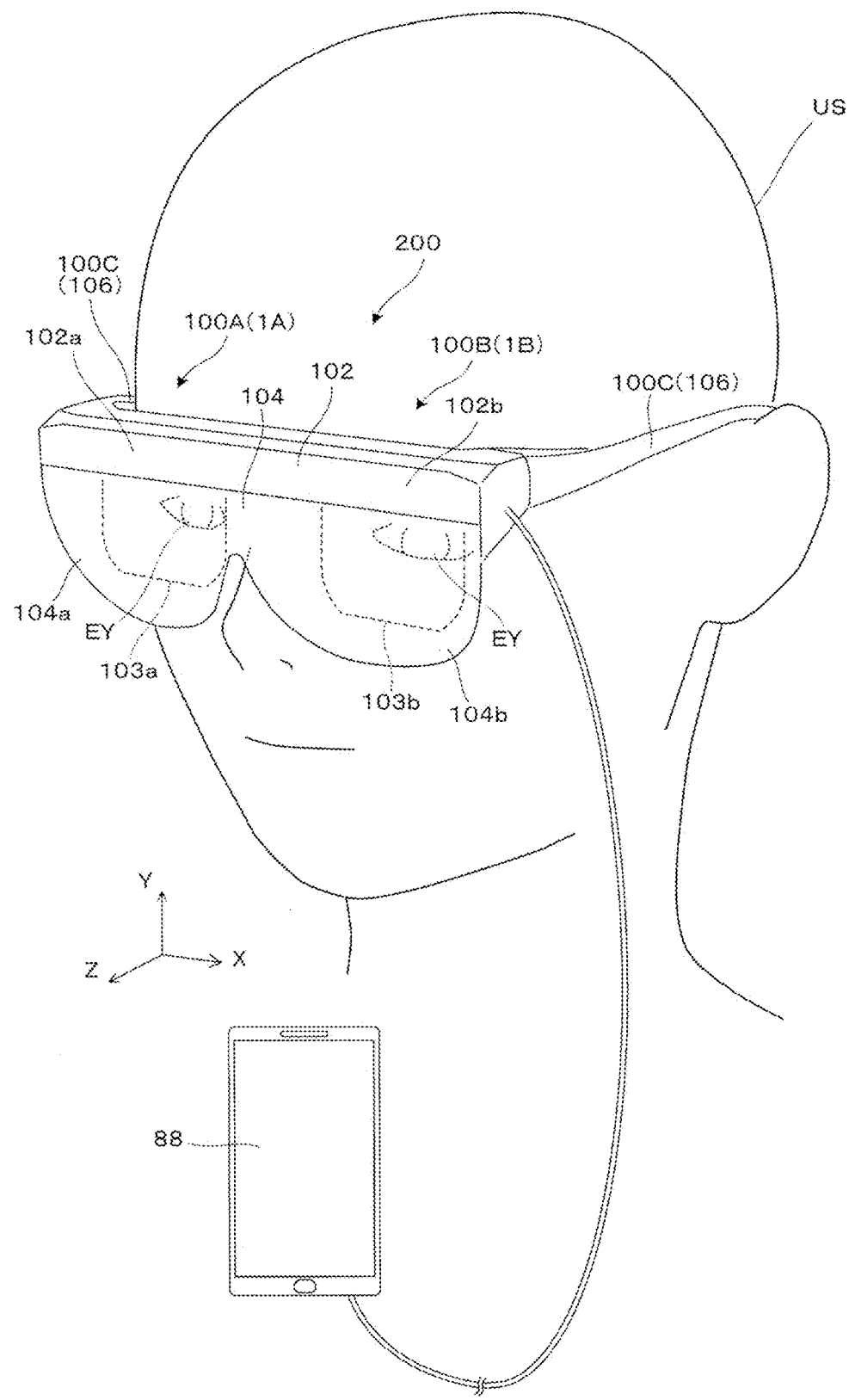
FIG. 1 is an external perspective view illustrating a mounted state of a virtual image display device according of a first exemplary embodiment.

FIG. 1 is a perspective view for describing a mounted state of a head-mounted display, in other words, a head-mounted display apparatus 200. The head-mounted display apparatus (hereinafter, also referred to as an HMD) 200 allows an observer or a wearer US who wears the HMD 200 to recognize a video as a virtual image. In FIG. 1 and the like, X, Y, and Z indicate an orthogonal coordinate system, a +X direction corresponds to a lateral direction in which both eyes EY of the observer or wearer US wearing the HMD 200 are aligned, a +Y direction corresponds to an upward direction orthogonal to the lateral direction in which both the eyes EY are aligned for the wearer US, and a +Z direction corresponds to a forward or front direction for the wearer US. The +Y directions are parallel to the vertical axis or the vertical direction.

The HMD 200 includes a first virtual image display device 100A for a right eye, a second virtual image display device 100B for a left eye, a pair of temples 100C that support the virtual image display devices 100A and 100B, and a user terminal 88 being an information terminal. The user terminal 88 supplies image data corresponding to a display image to be displayed by the first virtual image display device 100A and the second virtual image display device 100B, to the HMD 200. The virtual image display devices 100A and 100B are configured to perform see-through display in which an external image and a display image overlap with each other.

The first virtual image display device 100A is a first device 1A, and is constituted by a first display driving unit 102a that is arranged in an upper part, a first display optical system 103a that covers the front of the eyes, and a light transmitting cover 104a that covers the first display optical system 103a from the external side or the front side thereof. The second virtual image display device 100B is a second device 1B, and is constituted by a second display driving unit 102b that is arranged in an upper part, a second display optical system 103b that covers the front of the eyes, and a light transmitting cover 104b that covers the second display optical system 103b from the external side or the front side thereof. The HMD 200 obtained by combining the first virtual image display device 100A being the first device 1A and the second virtual image display device 100B being the second device 1B with each other is also a virtual image display device in a broader sense. The pair of temples 100C function as a mounting member or a support device 106 that is worn on the head of the wearer US, and support the upper end sides of the pair of display optical systems 103a and 103b and the upper end sides of the pair of light transmitting covers 104a and 104b via the display driving units 102a and 102b integrated in exterior. The pair of display driving units 102a and 102b are collectively referred to as a driving device 102 in some cases. The pair of light transmitting covers 104a and 104b are collectively referred to as a shade 104 in some cases.

Figure 2:
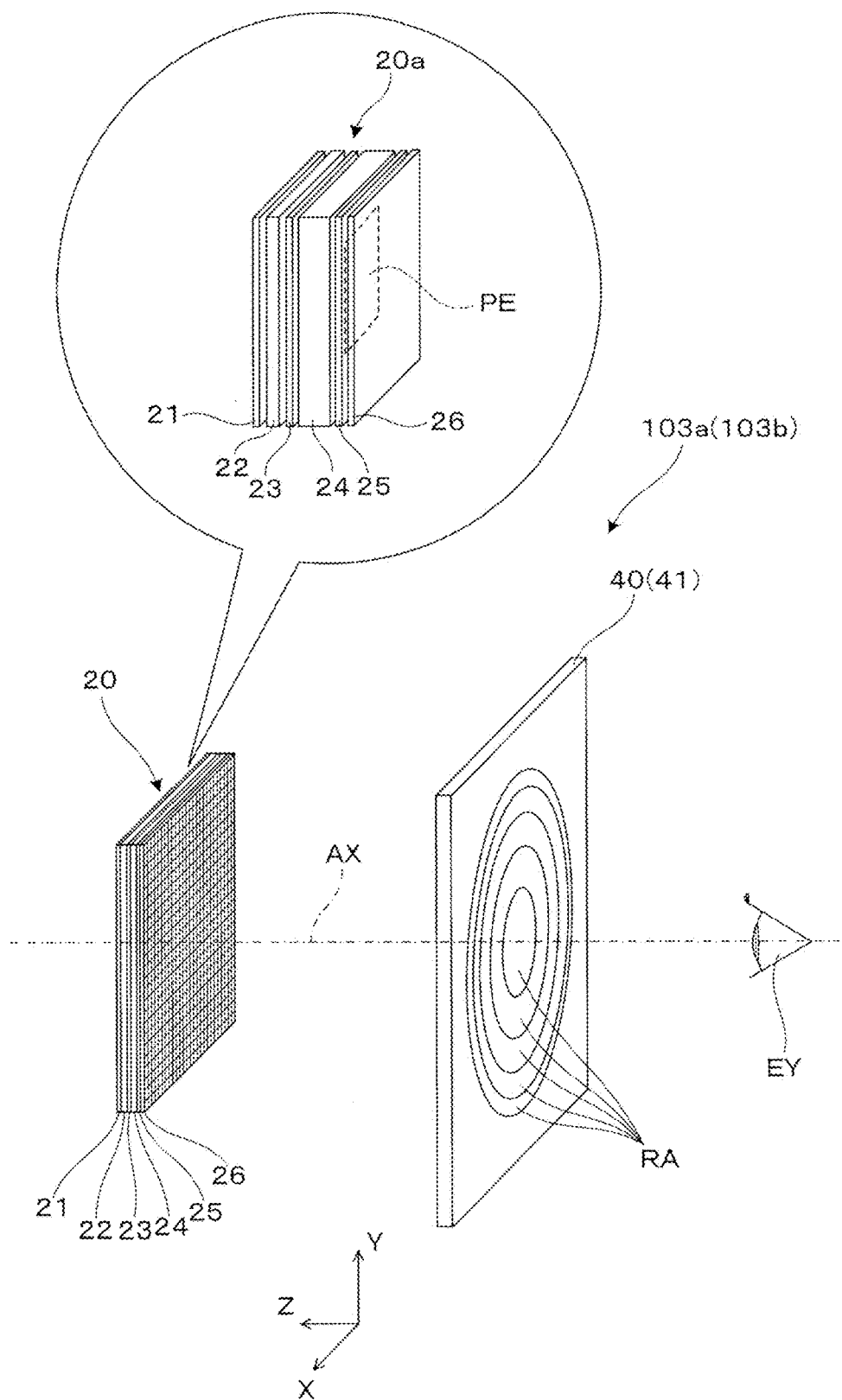
FIG. 2 is a schematic perspective view for describing an optical structure of a display optical system.

FIG. 2 is a perspective view for describing a structure of the first display optical system 103a. The first display optical system 103a includes a plate-like composite display member 20 that forms a two-dimensional display image and emits image light and a polarization separation lens element 40 that functions as a lens with respect to the image light. In order to achieve see-through display in which an external image and a display image overlap with each other, the composite display member 20 and the polarization separation lens element 40 are further configured to transmit external light from the external side. The composite display member 20 and the polarization separation lens element 40 are arranged separate from each other in a direction of an optical axis AX. The composite display member 20 is configured as a laminated body obtained by laminating and integrating a light shielding member 21, a backlight 22, a polarizing plate 23, a light modulating element 24, a polarizing plate 25, and an image selection conversion member 26. In the illustrated exemplary embodiment, the composite display member 20 is configured as a plate-like member that is vertically to the optical axis AX, in other words, parallel to the XY plane. The composite display member 20 is configured by a plurality of repetition units 20a that are arrayed two-dimensionally or in a matrix along the XY plane. Each of the repetition units 20a includes one liquid crystal pixel PE of the light modulating element 24. The image light is emitted from each of the liquid crystal pixels PE.

The polarization separation lens element 40 is arranged on the face side of the image selection conversion member 26 of the composite display member 20, in other words, on the −Z side to cover the front of the eye, and adjusts a radiation angle of the image light by refracting the image light emitted from the composite display member 20. The composite display member 20 that generates the image light is positioned close to an observer or a wearer. Thus, the image light may not be parallel light in some cases. Meanwhile, the external light arrives from a far light source, and hence may be considered as parallel light. A human eye is basically configured to observe parallel light. Thus, the polarization separation lens element 40 selectively refracts the image light without refracting the external light, and collimates the image light to parallel light or adjusts the radiation angle of the image light to obtain a luminous flux close to parallel light. With this, both the external image and the display image can be observed. With this, see-through display in which an external image and a display image overlap with each other is achieved.

In the illustrated exemplary embodiment, a liquid crystal lens 41 is used as the polarization separation lens element 40. The liquid crystal lens 41 is a single independent lens that collectively refracts the image light emitted from the plurality of liquid crystal pixels PE of the light modulating element 24. In the illustrated exemplary embodiment, the liquid crystal lens 41 includes a plurality of circular orbicular zones RA that are plate-like members extending in parallel to the XY plane and have different refractive index states. The orbicular zones RA in a group are concentrically arranged symmetrically about the optical axis AX. In the group of the orbicular zones RA, the orbicular zone RA in the periphery away from the optical axis AX has a width in the radial direction with the optical axis Ax as a center, which is smaller than that of the orbicular zone RA at the center through which the optical axis AX passes. In other words, the width of the orbicular zone RA in the radial direction is smaller as approaching the periphery of the liquid crystal lens 41. Details of the liquid crystal lens 41 are described later.

The second display optical system 103b is optically similar to the first display optical system 103a, or is obtained by inverting the first display optical system 103a horizontally. Thus, detail description thereof is omitted.

Figure 3:
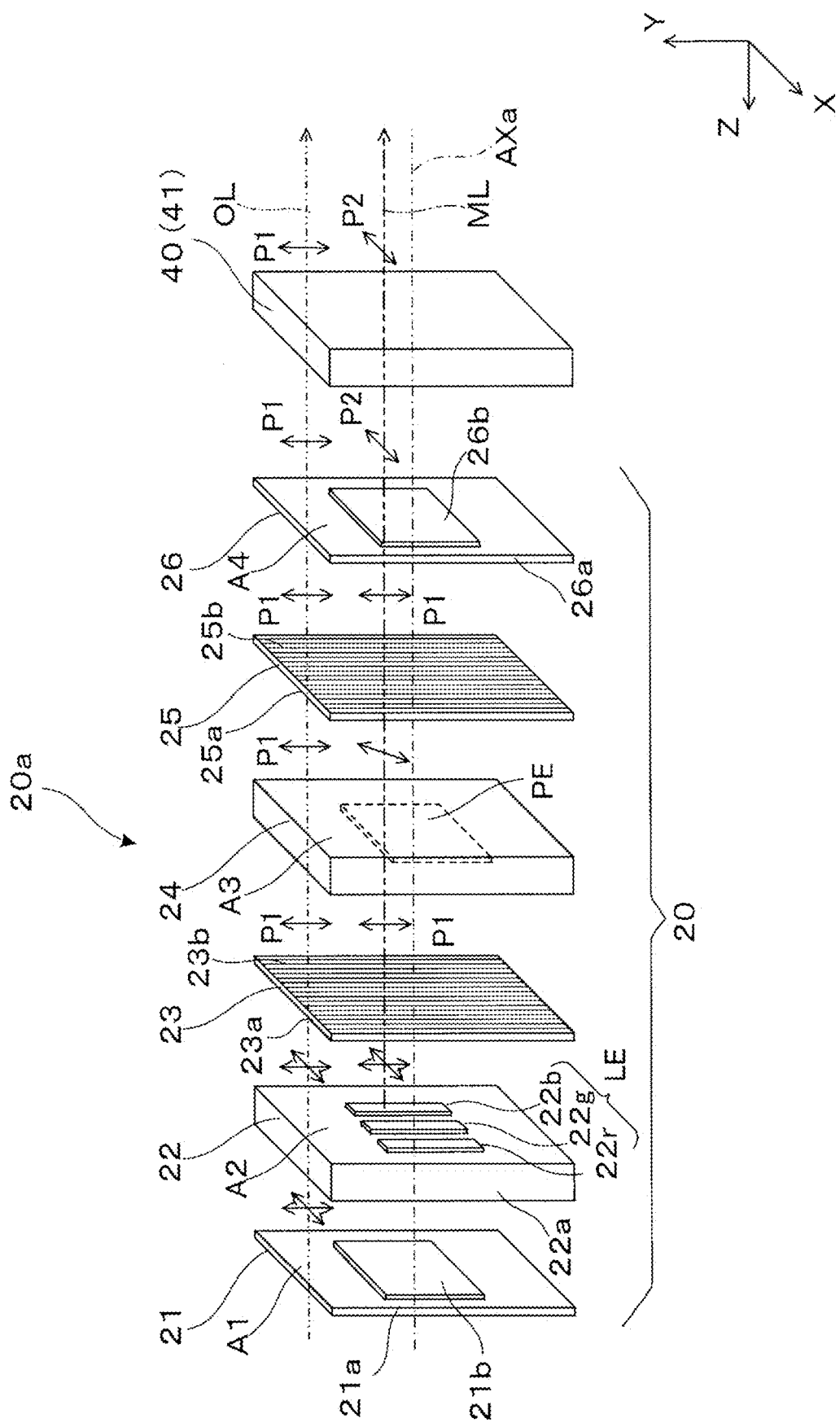
FIG. 3 is an enlarged perspective view for describing a repetition unit of a composite display member.

FIG. 3 is an enlarged perspective view for describing the repetition unit 20a of the composite display member 20. Here, an axis AXa is an axis parallel to the optical axis AX illustrated in FIG. 2.

The light shielding member 21 is obtained by providing a rectangular light shielding layer 21b on a flat plate 21a having light transmittance. Although FIG. 3 only illustrates one light shielding layer 21b, on the entire light shielding member 21, the large number of light shielding layers 21b are arrayed two-dimensionally or in a matrix along a plane parallel to the XY plane. In other words, all the light shielding layers 21b constituting the light shielding member 21 are two-dimensionally arrayed periodically with respect to the horizontal X direction and the vertical Y direction. Each of the light shielding layers 21b is formed at a position corresponding to the liquid crystal pixel PE in each of the repetition units 20a, and suppresses incidence of the external light OL on the corresponding liquid crystal pixel PE. Meanwhile, a light transmitting region A1 of the light shielding member 21 in which the light shielding layer 21b is not provided transmits the external light OL. The external light OL that passes through the light transmitting region A1 is finally incident on an eye of an observer or a wearer, and is observed as an external image.

In one exemplary embodiment, the light shielding layer 21b may be formed by light-absorbing paint or other substances, and may be formed through application thereof to a target area by an ink-jet method, for example. In another exemplary embodiment, a mold release pattern formed of a mold release agent is recorded in advance at a position on the flat plate 21a at which the light shielding layer 21b is not formed. A spray containing light-absorbing substances is applied over the entire surface, and then the light-absorbing substances are removed at the position corresponding to the mold release pattern. With this, the light shielding layer 21b may be formed of the remaining light-absorbing substance layer. Further, a metal pattern is formed by using a photoresist technique or the like at a position on the flat plate 21a at which the light shielding layer 21b is to be formed, and the metal pattern is oxidized to improve an absorbing property. The light shielding layer 21b may be thus formed.

The backlight 22 is arranged on the face side of the light shielding member 21, and is configured to irradiate the light modulating element 24 with the backlight light. The backlight 22 includes a transparent baseplate 22a having light transmittance and a light emitting unit LE formed on the transparent baseplate 22a. The light emitting unit LE irradiates the light modulating element 24 with the backlight light. Although only one light emitting unit LE is illustrated in FIG. 3, on the entire backlight 22, the large number of light emitting units LE are arrayed two-dimensionally or in a matrix along a plane parallel to the XY plan. In other words, the light emitting units LE are two-dimensionally arrayed periodically with respect to the horizontal X direction and the vertical Y direction. Each of the light emitting units LE is formed in a region of each of the repetition units 20a that corresponds to the liquid crystal pixel PE of the light modulating element 24, and is configured to irradiate the corresponding liquid crystal pixel PE with the backlight light. The size of the light emitting unit LE of the backlight 22 is equivalent to the size of the liquid crystal pixel PE of the light modulating element 24. Alternatively, the size of the liquid crystal pixel PE is slightly larger in consideration of diffusion of the backlight light. With this, even when the backlight light is diffused, the backlight light is collectively incident on the liquid crystal pixel PE.

Each of the light emitting units LE is configured to irradiate the liquid crystal pixel PE with the light of three colors as the backlight light in a time-division manner. The light of three colors is selected in such a way that the colors can represent any color within a desired color gamut for a display image and result in white light when the colors overlap with one another. In the illustrated exemplary embodiment, each of the light emitting units LE includes an R light emitting element 22r that generates red light, a G light emitting element 22g that generates green light, and a B light emitting element 22b that generates blue light. The R light emitting element 22r, the G light emitting element 22g, and the B light emitting element 22b may be a self light emitting element such as a light emitting diode including an organic light emitting diode (OLED) and a micro light emitting diode (μLED) formed of an organic material. The backlight 22 further includes wiring lines for driving the R light emitting element 22r, the G light emitting element 22g, and the B light emitting element 22b, which are not illustrated in FIG. 3. Further, FIG. 3 illustrates a state in which the R light emitting element 22r, the G light emitting element 22g, and the B light emitting element 22b are arrayed in parallel to the X axis. However, the arrangement of the R light emitting element 22r, the G light emitting element 22g, and the B light emitting element 22b is not limited to the illustrated arrangement.

The backlight 22 further includes a light transmitting region A2 configured to transmit at least part of the external light OL that arrives without being blocked by the light shielding member 21. In one exemplary embodiment, a part of the transparent baseplate 22a other than a part in which the light emitting unit LE is provided is used as the light transmitting region A2.

Figure 4:
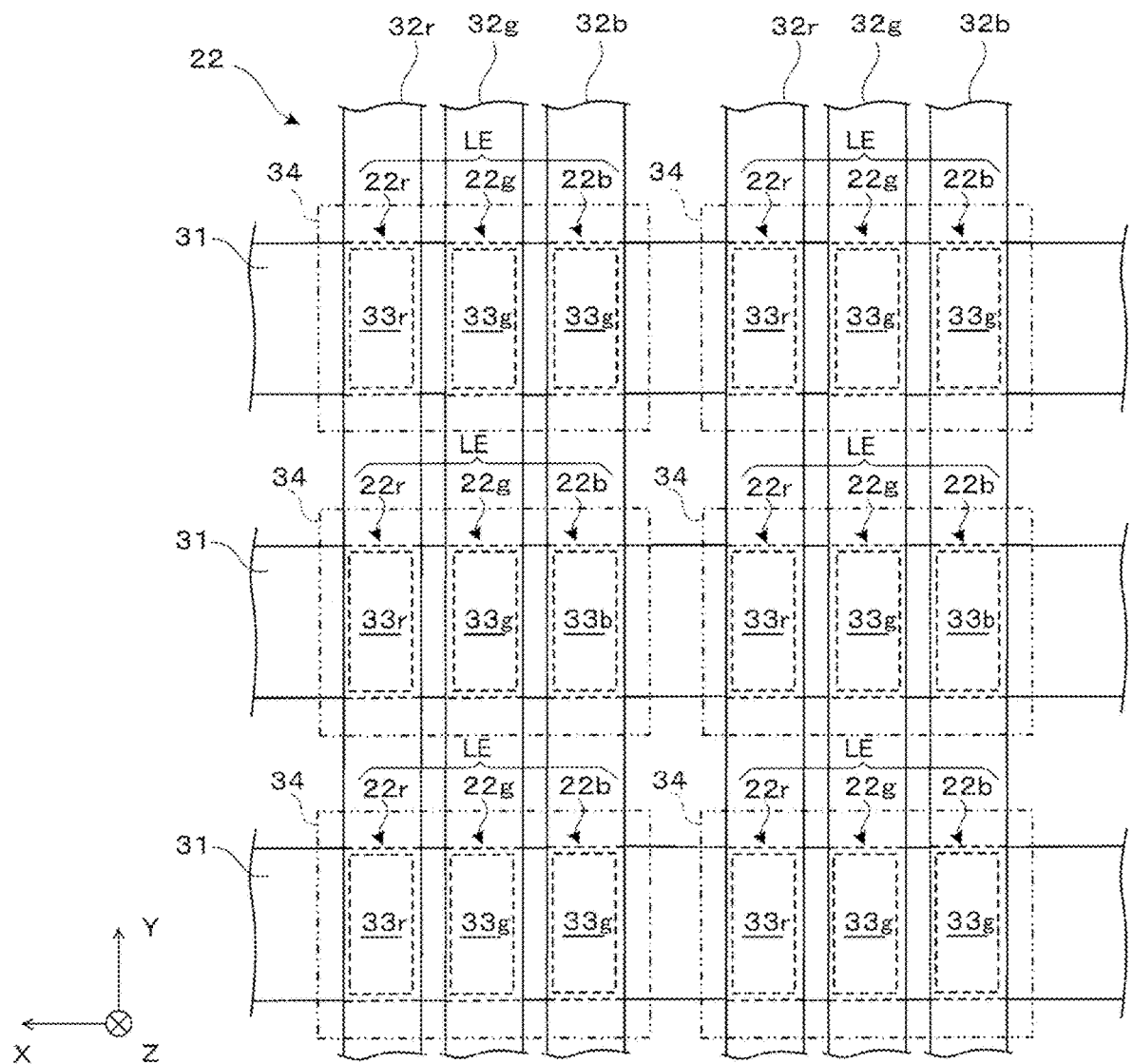
FIG. 4 is a plan view illustrating one example of a configuration of a backlight.

FIG. 4 is a plan view illustrating an example of a configuration of the backlight 22. In the illustrated exemplary embodiment, the backlight 22 includes a plurality of electrodes 31, a plurality of R electrodes 32r, a plurality of G electrodes 32g, a plurality of B electrodes 32b, a plurality of R light emitting layers 33r, a plurality of G light emitting layers 33g, and a plurality of B light emitting layers 33b. The electrodes 31 are provided to extend in a direction parallel to the X axis, the R electrodes 32r, the G electrodes 32g, and the B electrodes 32b are provided to extend in a direction parallel to the Y axis.

In one exemplary embodiment, the electrode 31, the R electrode 32r, the G electrode 32g, and the B electrode 32b may be formed of transparent electrodes formed of indium tin oxide (ITO). With this, the R light emitting layer 33r, the G light emitting layer 33g, and the B light emitting layer 33b can irradiate the liquid crystal pixels PE of the light modulating element 24 with a larger amount of the generated light, and a larger amount of the external light OL arriving at the backlight 22 can be transmitted. Further, even when the light transmitting region A2 is not provided intentionally, the backlight 22 can transmit the external light OL to allow an observer or a wearer to observe the external light OL by using the transparent electrode.

In the illustrated exemplary embodiment, the R light emitting element 22r is configured by the R light emitting layer 33r and a portion between the electrode 31 and the R light emitting layer 33r of the R electrode 32r. The R light emitting layer 33r is provided between the electrode 31 and the R electrode 32r, and emits light of a red color when the electrode 31 and the R electrode 32r apply a driving voltage or a driving current. Further, the G light emitting element 22g is configured by the G light emitting layer 33g and a portion between the electrode 31 and the G light emitting layer 33g of the G electrode 32g. The G light emitting layer 33g is provided between the electrode 31 and the G electrode 32g, and emits light of a green color when the electrode 31 and the G electrode 32g apply a driving voltage or a driving current. Further, the B light emitting element 22b is configured by the B light emitting layer 33b and a portion between the electrode 31 and the B light emitting layer 33b of the B electrode 32b. The B light emitting layer 33b is provided between the electrode 31 and the B electrode 32b, and emits light of a blue color when the electrode 31 and the B electrode 32b apply a driving voltage or a driving current.

When the backlight 22 thus configured is operated in the following manner, for example, the light of the three primary colors, in other words, the light of the red color, the green color, and the blue color can be generated in a time-division manner. In a period during which the red light is generated as the backlight light (hereinafter, also referred to as a "red light emitting period" in some cases), the electrode 31 and the R electrode 32*r* are used to apply a driving voltage or a driving current for driving the R light emitting layer 33*r*, and the R light emitting layer 33*r* generates the red light. In the red light emitting period, the G electrode 32*g* and the B electrode 32*b* are held at the same potential as the electrode 31 or brought to a high impedance, and the G light emitting layer 33*g* and the B light emitting layer 33*b* are not driven. In a period during which the green light is generated as the backlight light (hereinafter, also referred to as a "green light emitting period" in some cases), the electrode 31 and the G electrode 32*g* are used to drive the G light emitting layer 33*g*, and the G light emitting layer 33*g* generates the green light. In the green light emitting period, the R electrode 32*r* and the B electrode 32*b* are held at the same potential as the electrode 31 or brought to a high impedance, and the R light emitting layer 33*r* and the B light emitting layer 33*b* are not driven. In a period during which the blue light is generated as the backlight light (hereinafter, also referred to as a "blue light emitting period" in some cases), the electrode 31 and the B electrode 32*b* are used to drive the B light emitting layer 33*b*, and the B light emitting layer 33*b* generates the blue light. In the blue light emitting period, the R electrode 32*r* and the G electrode 32*g* are held at the same potential as the electrode 31 or brought to a high impedance, and the R light emitting layer 33*r* and the G light emitting layer 33*g* are not driven.

In addition to the red light emitting period, the green light emitting period, and the blue light emitting period, there may be introduced a full light emitting period during which all the R light emitting element 22*r*, the G light emitting element 22*g*, and the B light emitting element 22*b* emit the light. By introducing the full light emitting period, brightness of an entire displayed image can be enhanced.

In FIG. 4, the reference symbol 34 with the two-dot chain line box indicates a region corresponding to the liquid crystal pixel PE of the light modulating element 24. In the illustrated exemplary embodiment, the region 34 is projection on the surface of the transparent baseplate 22*a* of the liquid crystal pixel PE. Each of the light emitting units LE, in other words, one group including the R light emitting element 22*r*, the G light emitting element 22*g*, and the B light emitting element 22*b* is arranged in the region 34 corresponding to the liquid crystal pixel PE of the light modulating element 24, and irradiates the corresponding liquid crystal pixel PE with the generated light of the three primary colors as the backlight light in a time-division manner.

Figure 5A:
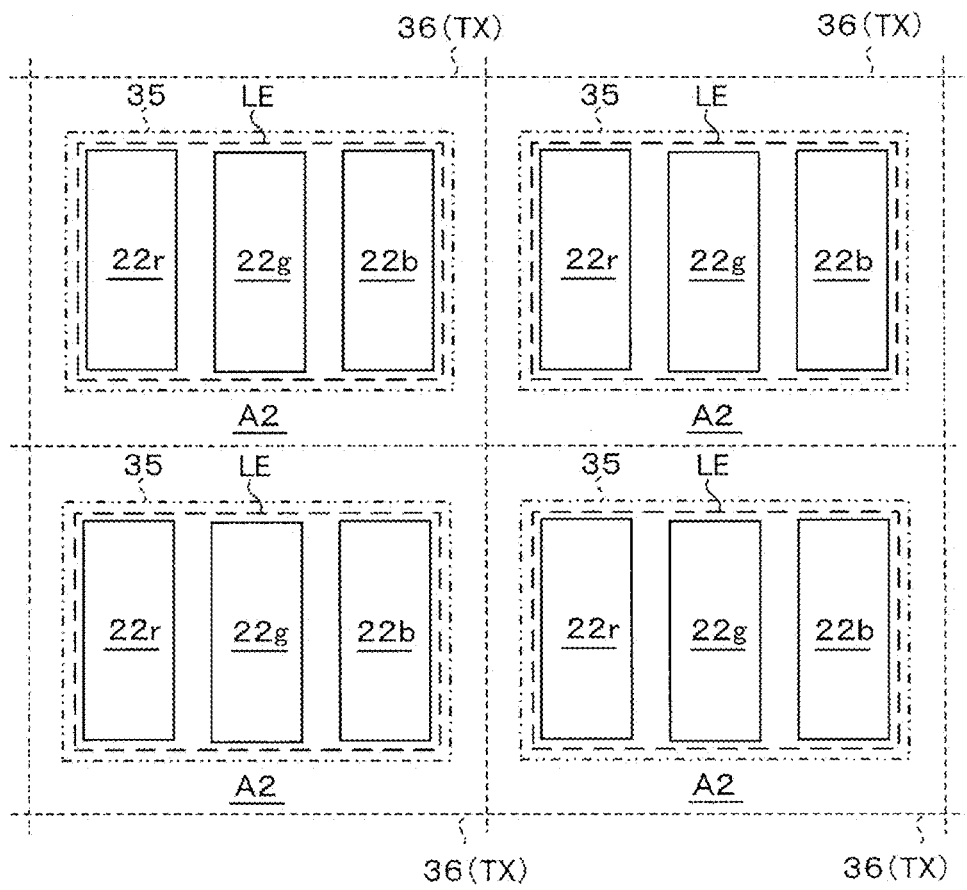
FIG. 5A is a plan view illustrating one example of a position relationship between a light emitting unit of the backlight and a liquid crystal pixel.
Figure 5A:
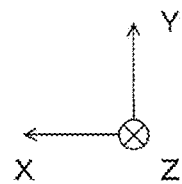

FIG. 5A illustrates one example of a position relationship between each of the light emitting units LE of the backlight 22 and the liquid crystal pixel PE. FIG. 5A, the reference symbol 35 with the two-dot chain line box indicates a region corresponding to the liquid crystal pixel PE of the light modulating element 24. In the illustrated exemplary embodiment, the region 35 is projection on the surface of the transparent baseplate 22*a* of the liquid crystal pixel PE. The backlight 22 includes repetition sections 36 each of which corresponds to the repetition unit 20*a* in FIG. 2. Although only four repetition sections 36 are illustrated in FIG. 5A, on the entire backlight 22, the large number of the repetition sections 36 are arrayed two-dimensionally or in a matrix along a plane parallel to the XY plan. Each of the repetition sections 36 includes the light emitting unit LE and the light transmitting region A2. Each of the light emitting units LE includes one R light emitting element 22*r*, one G light emitting element 22*g*, and one B light emitting element 22*b*. Each of the light emitting units LE is positioned in the region 35 corresponding to the liquid crystal pixel PE, and faces the liquid crystal pixel PE. The repetition section 36 may be regarded as a combination of the light emitting unit LE and a light transmitting region 37, and may also be regarded as a see-through image display pixel TX. The external light OL that is not blocked by the light shielding member 21 passes through the light transmitting region 37 being a part of the see-through image display pixel TX of the backlight 22, and is incident on the light modulating element 24. Meanwhile, the backlight light is emitted from the light emitting unit LE being a part of the see-through image display pixel TX, and is incident on the light modulating element 24.

Figure 5B:
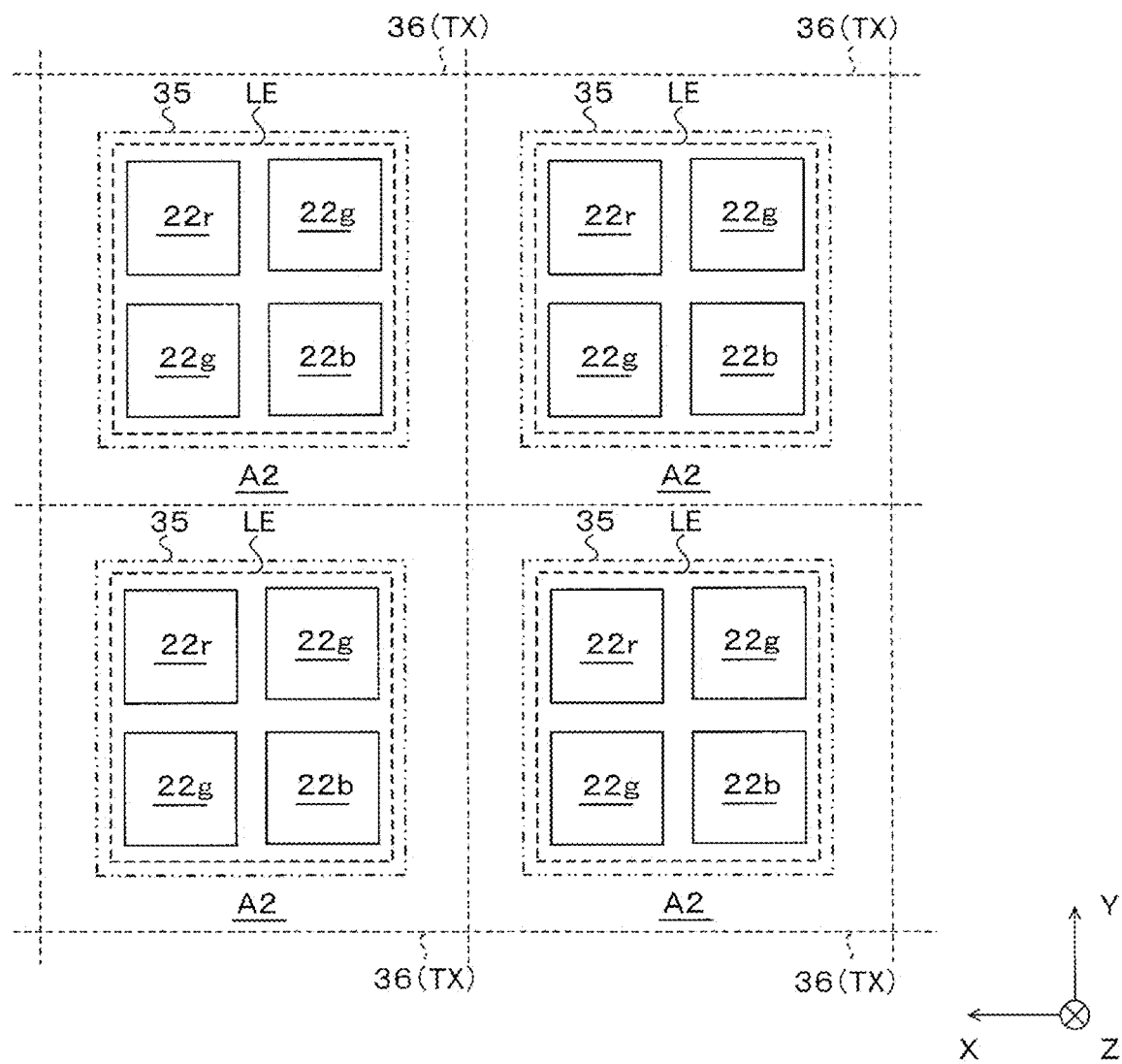
FIG. 5B is a plan view illustrating another example of the position relationship between the light emitting unit of the backlight and the liquid crystal pixel.

FIG. 5B illustrates another example of a position relationship between each of the light emitting units LE of the backlight 22 and the liquid crystal pixel PE. In FIG. 5B, the region 35 corresponding to the liquid crystal pixel PE of the light modulating element 24 is also indicated with the two-dot chain line. The exemplary embodiment illustrated in FIG. 5B is different from the exemplary embodiment illustrated in FIG. 5A in that each of the light emitting units LE includes one R light emitting element 22*r*, two G light emitting elements 22*g*, and one B light emitting element 22*b* that are arranged in the Bayer array. In the exemplary embodiment in FIG. 5B, each of the light emitting units LE that includes the one R light emitting element 22*r*, the two G light emitting elements 22*g*, and the one B light emitting element 22*b* is also arranged in the region 35 corresponding to the liquid crystal pixel PE of the light modulating element 24. A person skilled in the art easily understands that the wiring line provided to the backlight 22 is designed according to arrangement of the R light emitting element 22*r*, the G light emitting elements 22*g*, and the B light emitting element 22*b*.

Referring back to FIG. 3, the polarizing plate 23 of the composite display member 20 is arranged on the face side of the backlight 22, and is configured to limit transmitted light in a predetermined polarization direction, specifically, into vertically polarized light being polarized light in a first direction, and block horizontally polarized light being polarized light in a second direction orthogonal to the first direction. In the illustrated exemplary embodiment, the vertically polarized light is polarized light having a polarization plane parallel to the vertical ±Y direction, and the horizontally polarized light is polarized light having a polarization plane parallel to the horizontal ±X direction. In FIG. 3 and the other drawings, the vertically polarized light is denoted with "P1", and the horizontally polarized light is denoted with "P2". Due to an action of the polarizing plate 23, of the external light OL that passes through the light transmitting region A1 of the light shielding member 21 and the backlight light that is generated by the backlight 22, the horizontally polarized light is blocked by the polarizing plate 23, and the vertically polarized light P1 passes through the polarizing plate 23. In one exemplary embodiment, the polarizing plate 23 may be obtained by boning a polarizing film 23*b* of an absorbing type on a flat plate 23*a* having light transmittance. The polarizing film 23*b* may be a resin sheet obtained by extending polyvinyl alcohol (PVA) with iodine adsorbed thereon in a specific direction, for example. In the illustrated example, the polarizing film 23*b* only transmits the vertically polarized light P1 having a polarization plane parallel to the vertical ±Y direction, and absorbs the horizontally polarized light having a polarization plane parallel to the horizontal ±X direction.

Further, the light modulating element 24 of the composite display member 20 is arranged on the face side of the polarizing plate 23, and the polarizing plate 25 is arranged on the face side of the light modulating element 24. The light modulating element 24 and the polarizing plate 25 are configured to modulate the backlight light that is incident on the liquid crystal pixel PE according to image data corresponding to a display image and generate image light ML. In detail, each of the liquid crystal pixels PE of the light modulating element 24 is driven by a driving voltage corresponding to gradation of each of the liquid crystal pixels PE indicated in the image data, a polarization plane of the backlight light is rotated by an angle corresponding to the driving voltage, and the image light ML is emitted. The vertically polarized light component or the horizontally polarized light component of the image light ML emitted from the liquid crystal pixel PE has a signal component, that is, intensity corresponding to tone of the liquid crystal pixel PE. The light modulating element 24 further transmits the external light OL through a light transmitting region A3. The polarizing plate 25 removes unnecessary one of the vertically polarized light component and the horizontally polarized light component of the incident image light ML, and emits the image light ML having light intensity corresponding to tone in each of the liquid crystal pixels PE. The polarization direction of the polarized light that can be transmitted through the polarizing plate 25 is selected so that the external light OL incident on the polarizing plate 25 is not substantially attenuated and the image light ML emitted from the polarizing plate 25 has intensity corresponding to the tone in the liquid crystal pixel PE. In the exemplary embodiment in FIG. 3, the external light OL incident on the polarizing plate 25 is the vertically polarized light P1, and the polarizing plate 25 is configured to remove the horizontally polarized light and transmit the vertically polarized light. With this, while the horizontally polarized light component of the image light ML is removed, the external light OL and a vertical component being the signal component of the image light ML are transmitted through the polarizing plate 25. Similarly to the polarizing plate 23, the polarizing plate 25 is obtained by boning a polarizing film 25b of an absorbing type on a flat plate 25a having light transmittance. The polarizing film 25b may be a resin sheet obtained by extending PVA with iodine adsorbed thereon in a specific direction, for example. In the example illustrated in FIG. 3, the polarizing film 25b only transmits the vertically polarized light P1 having a polarization plane parallel to the vertical ±Y direction, and absorbs the horizontally polarized light having a polarization plane parallel to the horizontal ±X direction.

For achieving color display, each of the liquid crystal pixels PE of the light modulating element 24 is driven in synchronization with generation of the backlight light of the three primary colors by the backlight 22 in a time-division manner. In the red light emitting period during which the reg light is generated as the backlight light, the liquid crystal pixel PE is driven by a driving voltage corresponding to tone of a red color. Similarly, in the green light emitting period during which the green light is generated as the backlight light, the liquid crystal pixel PE is driven by a driving voltage corresponding to tone of a green color. In the blue light emitting period during which the blue light is generated as the backlight light, the liquid crystal pixel PE is driven by a driving voltage corresponding to tone of a blue color. The backlight 22 generates the light of the three primary colors as the backlight light in a time-division manner, and irradiates the liquid crystal pixel PE. Thus, even when color display is performed, a low resolution of the light modulating element 24, in other words, low density of the liquid crystal pixel PE is allowed. With this, a ratio of the light transmitting region A3 to the light modulating element 24 can be increased, and a see-through transmittance can be improved.

Figure 9A:
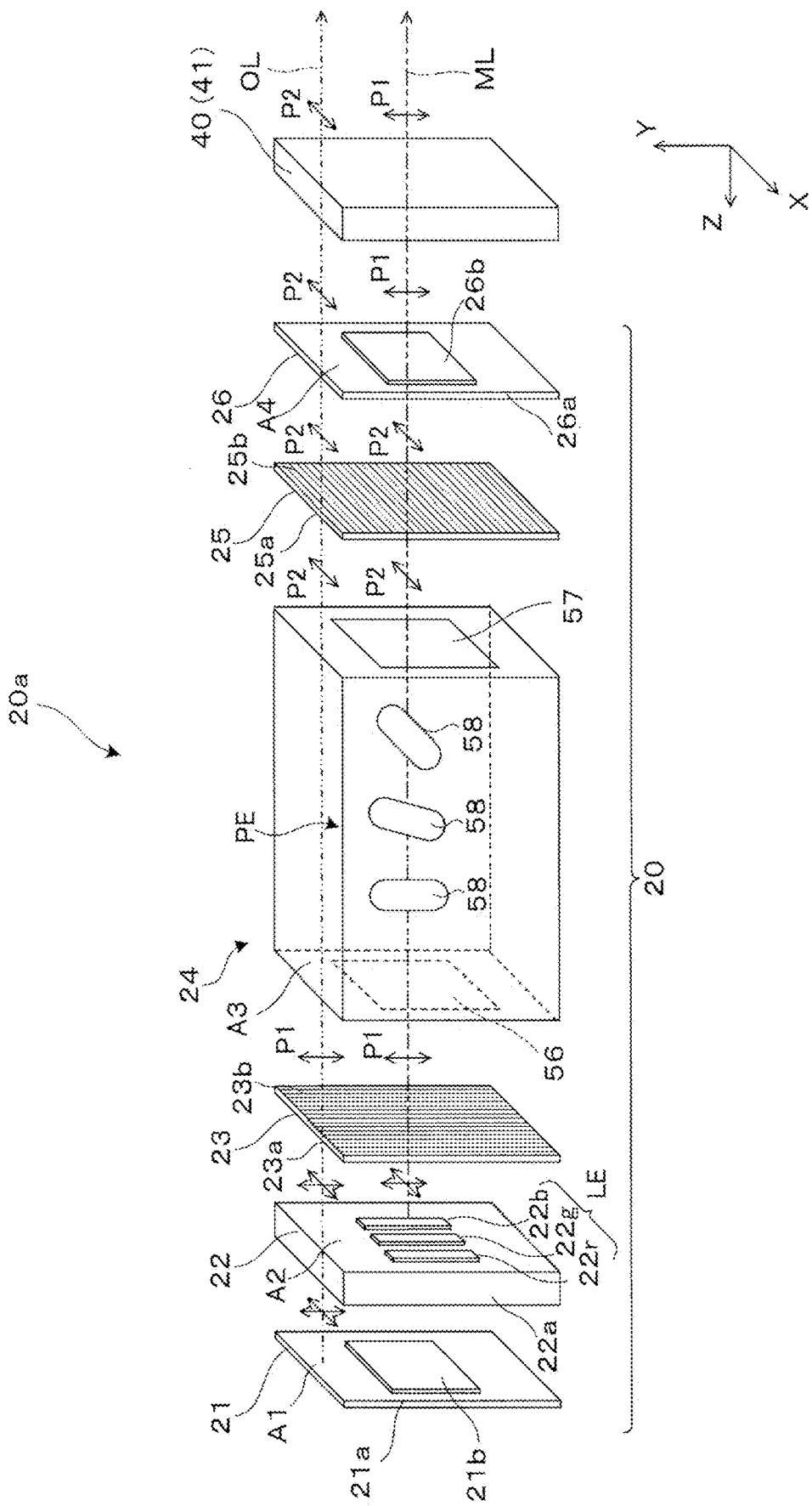
FIG. 9A is a perspective view illustrating a modification example of settings and operations of the light modulating element and a polarizing plate.
Figure 9B:
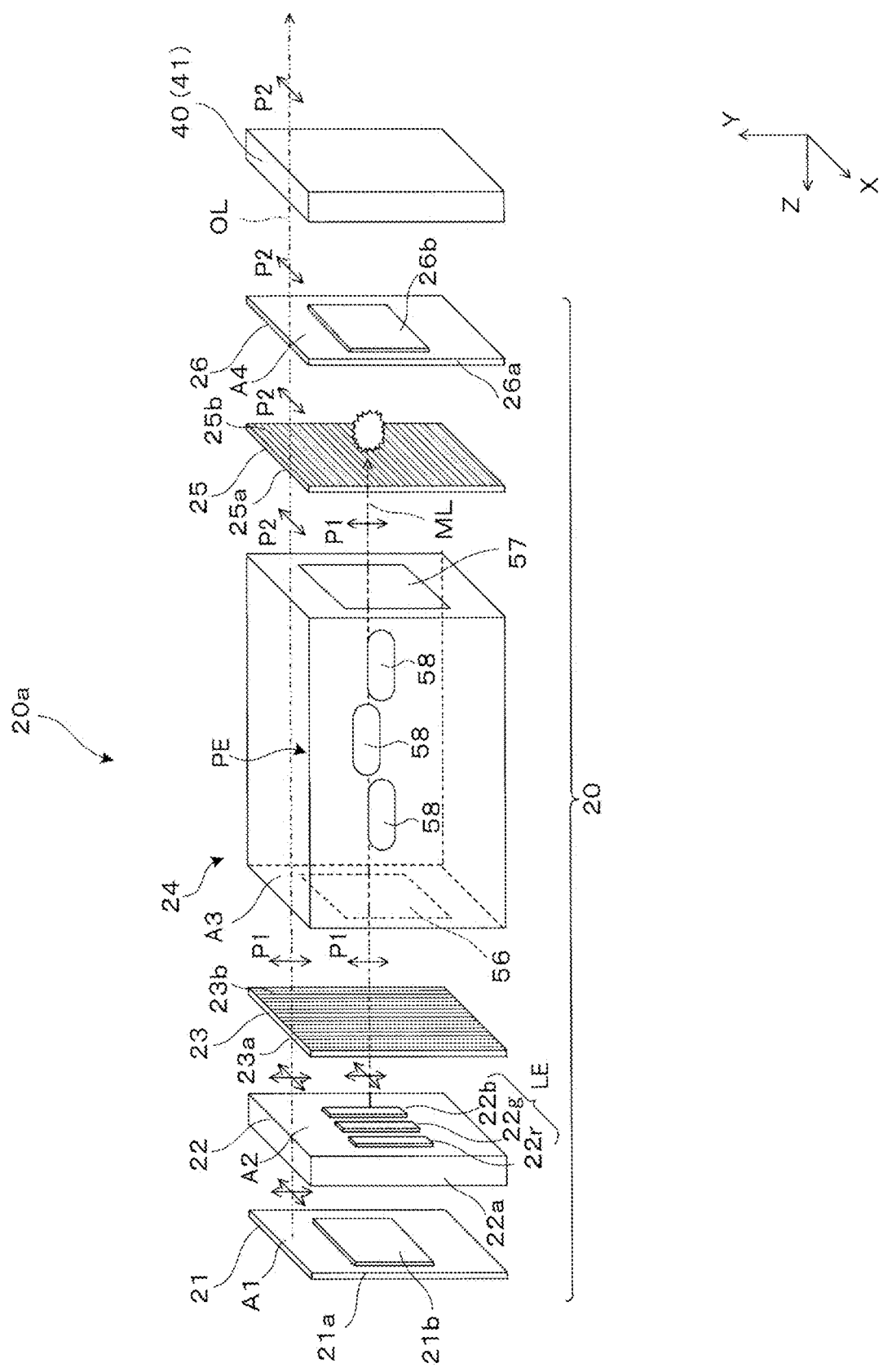
FIG. 9B is a perspective view illustrating a modification example of settings and operations of the light modulating element and the polarizing plate.

As described above, depending on the configuration of the light modulating element 24, the external light OL is converted from the vertically polarized light into the horizontally polarized light when the external light OL passes through the light transmitting region A3. As an example, there is given a case in which the light modulating element 24 includes Twisted Nematic (TN) liquid crystal layers in both of the light transmitting region A3 and the liquid crystal pixel PE. In such a case, for example, as illustrated in FIG. 9A and FIG. 9B described later, the polarizing plate 25 is configured to remove the vertically polarized light component of the incident image light ML and transmit the external light OL and the horizontal component of the image light ML. Rotation of the polarization plane of the external light OL by the light modulating element 24 and the configuration of the polarizing plate 25 corresponding thereto are described later in detail.

Figure 6:
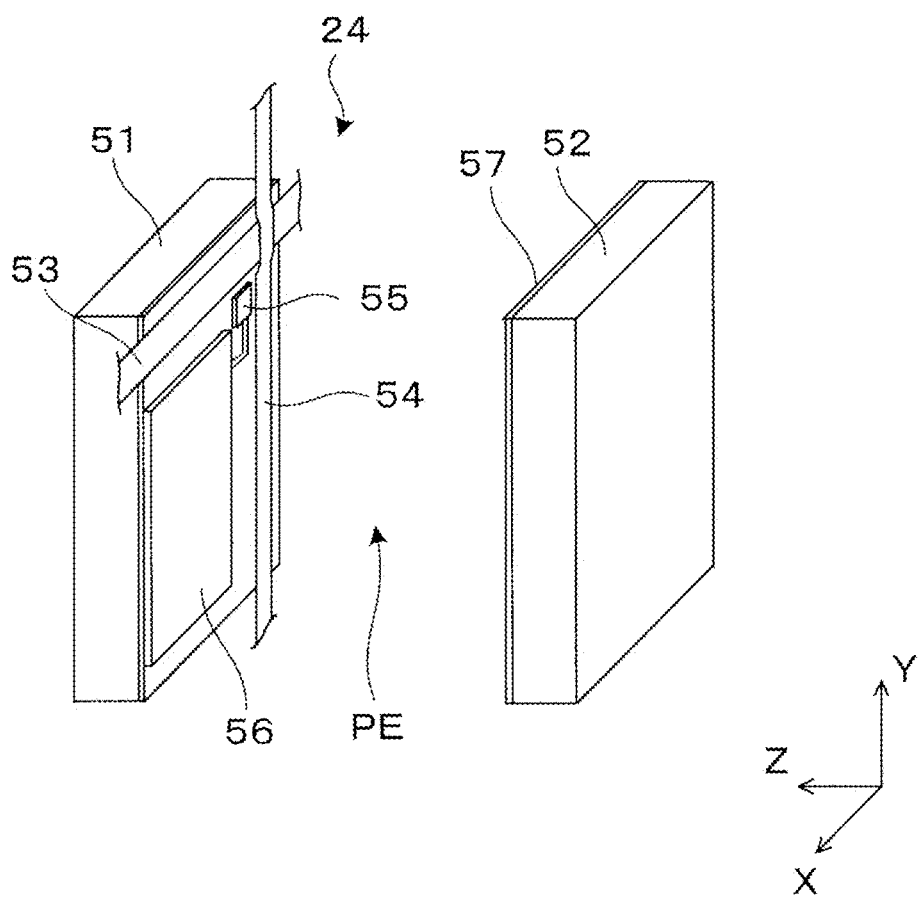
FIG. 6 is a schematic perspective view illustrating one example of a specific configuration of a light modulating element.

FIG. 6 is a schematic perspective view for describing one example of a specific example of the light modulating element 24. FIG. 6 illustrates a partial structure of the light modulating element 24 that corresponds to one repetition unit 20a. In the illustrated example, the light modulating element 24 is configured as a liquid crystal panel of an active matrix type. The light modulating element 24 includes a first base plate 51 and a second base plate 52 that is arranged to face the first base plate 51. The first base plate 51 and the second base plate 52 are formed of glass or plastic having light transmittance. A space between the first base plate 51 and the second base plate 52 is filled with liquid crystal. As the liquid crystal, TN liquid crystal, in-plane switching (IPS) liquid crystal, and Vertical Alignment (VA) liquid crystal may be used, for example. On the first base plate 51, a scanning line 53 that is also referred to as a gate, a signal line 54 that is also referred to as a source line, a driving element 55 that is a switch element, and a pixel electrode 56 are formed. In the illustrated exemplary embodiment, the scanning line 53 is provided to extend in parallel to the X axis, and the signal line 54 is provided to extend in parallel to the Y axis. The driving element 55 includes a thin film transistor (TFT), and is configured as a switch element that electrically couples the scanning line 53 and the pixel electrode 56 to each other when the scanning line 53 is selected by pulling the scanning line 53 up to a high potential. A counter electrode 57 that is maintained to a common voltage is formed on the second base plate 52. The pixel electrode 56, the counter electrode 57, and the liquid crystal layer present therebetween configure the liquid crystal pixel PE of the repetition unit 20a. The liquid crystal pixel PE is configured to rotate the polarization plane of the backlight light incident on the liquid crystal pixel PE by an angle corresponding to the driving voltage to emit the image light ML when a driving voltage corresponding to tone of the liquid crystal pixel PE indicated in the image data is written. The driving voltage is written in the liquid crystal pixel PE by supplying the driving voltage from a driver, which is omitted in illustration, to the pixel electrode 56 via the signal line 54 and the driving element 55 while the scanning line 53 is selected to turn on the driving element 55.

Although omitted in illustration, the light modulating element 24 may be configured such that the liquid crystal pixel PE is accommodated in a liquid crystal cell that is filled with liquid crystal and the liquid crystal layer is not present outside of the liquid crystal cell. With this configuration, the external light OL does not pass through the liquid crystal layer in the light transmitting region A3 outside of the liquid crystal pixel PE. Thus, as illustrated in FIG. 3, even when the liquid crystal for rotating a polarization plane is used without applying a voltage, the external light OL passing through the light transmitting region A3 is maintained as the vertically polarized light.

Referring back to FIG. 3, the image selection conversion member 26 is arranged on the face side of the polarizing plate 25, is configured to selectively change the polarization direction of the image light ML from the liquid crystal pixel PE without changing the polarization direction of the external light OL. In the illustrated exemplary embodiment, the image selection conversion member 26 is obtained by providing a rectangular wavelength plate 26b on a flat plate 26a having light transmittance. Although only one wavelength plate 26b is illustrated in FIG. 3, on the entire image selection conversion member 26, the large number of wavelength plates 26b are arrayed two-dimensionally or in a matrix along the XY plane. In other words, all the wavelength plates 26b constituting the image selection conversion member 26 are two-dimensionally arrayed periodically with respect to the horizontal X direction and the vertical Y direction. Each of the image selection conversion members 26 is formed in a region corresponding to the liquid crystal pixel PE in each of the repetition units 20a. A light transmitting region A4 of the image selection conversion member 26 in which the wavelength plate 26b is not provided transmits the external light OL. The wavelength plate 26b changes the image light ML being the vertically polarized light P1 in the first polarization direction, which is emitted from the liquid crystal pixel PE of the light modulating element 24 and passes through the polarizing plate 25, into the image light ML being the horizontally polarized light P2 in the second polarization direction orthogonal to the first polarization direction. The wavelength plate 26b is a ½ wavelength plate for changing the polarization direction of the image light ML, and converts the image light ML being the vertically polarized light P1 having a polarization plane parallel to the Y direction into the image light ML being the horizontally polarized light P2 having a polarization plane parallel to the X direction by setting a delayed-phase axis or an optical axis to a 45-degree direction between the +X direction and the +Y direction, for example.

For example, as a method of creating the wavelength plate 26b, one possible approach involves uniformly applying a light alignment material containing a specific type of liquid crystal onto the flat plate 26a, adjusting alignment by irradiation with polarization UV light, and fixing the light alignment material by executing a fixation process with heating temperature and duration while maintaining the alignment. Further, a wavelength plate can also be obtained by forming a base layer by nano-imprinting or the like and then repeatedly forming deposition films on the base layer to form a crystal lattice structure.

In the description relating to FIG. 3, it is assumed that the polarizing plates 23 and 25 only transmit the external light OL and the image light ML being the vertically polarized light P1 and the image selection conversion member 26 selectively changes or converts the image light ML being the vertically polarized light P1 into the image light ML being the horizontally polarized light P2. However, the polarizing plates 23 and 25 may only transmit the external light OL and the image light ML being the horizontally polarized light, for example. In this case, it is assumed that the image selection conversion member 26 includes a function of selectively changing or converting the image light ML being the horizontally polarized light into the image light ML being the vertically polarized light. In addition, with regard to the liquid crystal lens 41, which is described later, the polarization directions for the lens function are changed accordingly as the functions of the polarizing plate 23, the polarizing plate 25, and the image selection conversion member 26 are changed.

The polarization separation lens element 40 is arranged on the face side of the image selection conversion member 26 of the composite display member 20, and selectively collimates the image light ML to parallel light without refracting the external light OL or shapes the image light ML to a luminous flux close to parallel light. The polarization separation lens element 40 is configured to function as a lens by exerting a lens effect on the vertically polarized light, but does not exert a lens effect on the horizontally polarized light. With this, the polarization separation lens element 40 includes a lens function of selectively refracting the image light ML being the horizontally polarized light P2 without refracting the external light OL being the vertically polarized light P1. In one exemplary embodiment, as the polarization separation lens element 40 having such a lens function, the liquid crystal lens 41 is used.

Figure 7:
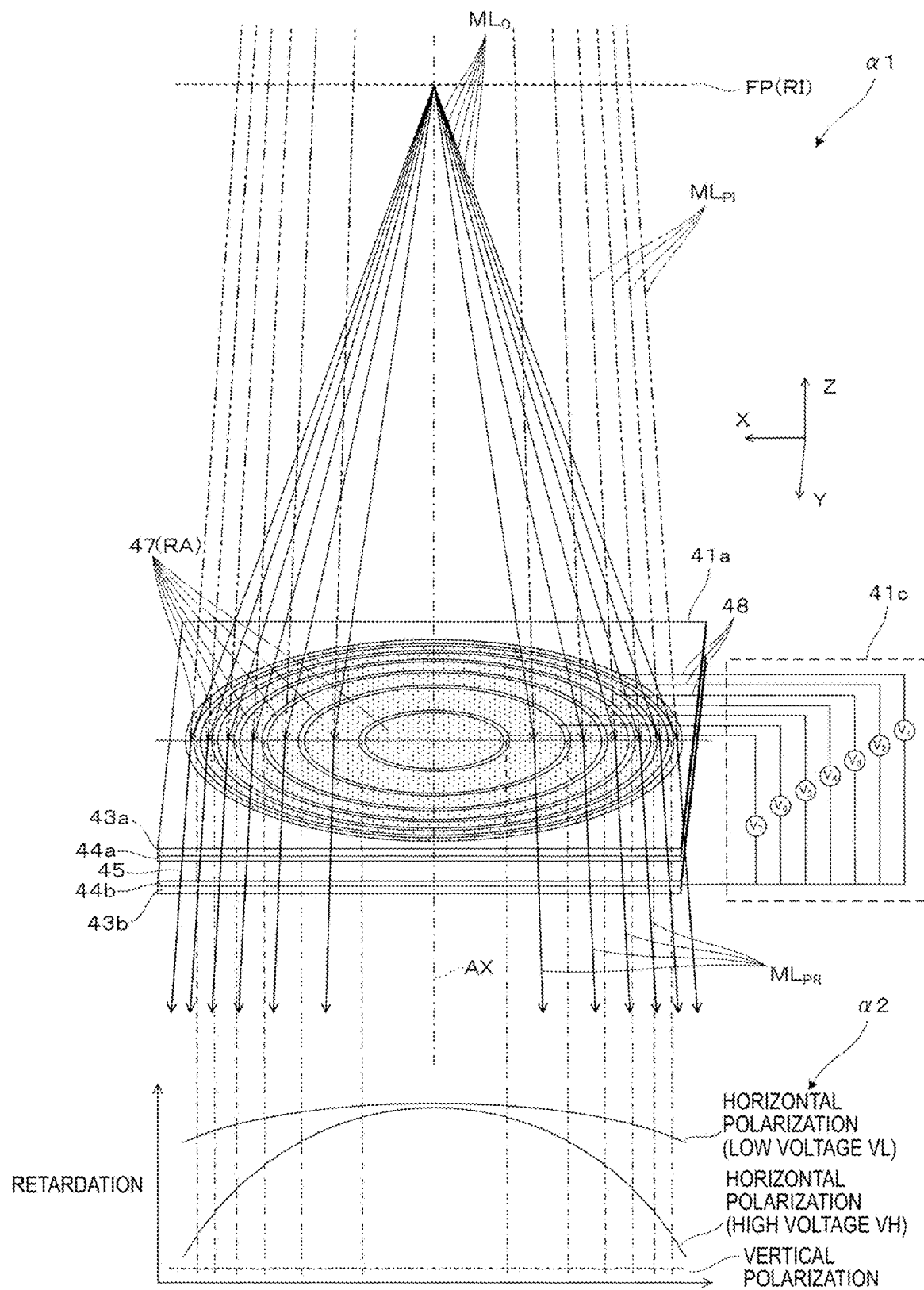
FIG. 7 is a schematic perspective view for describing a structure and a function of a liquid crystal lens.

FIG. 7 is a view for describing a structure and a function of the liquid crystal lens 41 that is used as the polarization separation lens element 40. In FIG. 7, an upper side a1 is a conceptual perspective view of the liquid crystal lens 41, and a lower side α2 is a chart illustrating a distribution state of retardation of the liquid crystal lens 41. The liquid crystal lens 41 is a lens that functions as a lens with respect to a specific polarization component, and is capable of changing the lens function, that is, power by external control. In other words, the liquid crystal lens 41 has refractive power that acts on polarization of the image light ML, and is capable of changing the refractive power for each of the orbicular zones RA. When vertically polarized light and horizontally polarized light are incident, the liquid crystal lens 41 selectively acts as a lens on polarized light in one direction according to distribution of a refractive index, and transmits polarized light in the other direction substantially as it is without acting thereon. In the exemplary embodiment in FIG. 3, the polarized light in one direction specifically corresponds to the image light ML being the horizontally polarized light, and the polarized light in the other direction specifically corresponds to the external light OL being the vertically polarized light. When distribution of a refractive index on the liquid crystal lens 41 is increased or reduced overall, the refractive power of the liquid crystal lens 41 can also be increased or reduced.

The liquid crystal lens 41 includes a lens member 41a and a drive circuit 41c. The lens member 41a includes two light transmitting substrates 43a and 43b facing each other, two electrode layers 44a and 44b provided on the inner surfaces of the light transmitting substrates 43a and 43b, and a liquid crystal layer 45 interposed between the electrode layers 44a and 44b. Not that, although not illustrated in the drawing, alignment films are arranged between the electrode layers 44a and 44b and the liquid crystal layer 45 to adjust an initial alignment state of the liquid crystal layer 45. The first electrode layer 44a includes a large number of electrodes 47 arranged concentrically along the XY plane in the orbicular zone RA, and the electrodes 47 are annular transparent electrodes. The large number of electrodes 47 are spaced apart from each other, and the lateral width of the electrode 47 located on the outer side is narrowed. The lateral width of the electrode 47 affects the accuracy of a refraction action of the lens member 41a. The electrodes 47 are coupled to the drive circuit 41c via a wiring 48 insulated by an insulating layer, which is not illustrated in the drawing, on a route in the middle. The second electrode layer 44b is a common electrode extending parallel to the XY plane, and is uniformly formed along the light transmitting substrate 43b. Different application voltages V1 to V7 are applied to the large number of electrodes 47 to change a distribution state of birefringence or retardation. When the liquid crystal lens 41 has an effect of a convex lens, the application voltage V1 is set higher than the application voltage V7, and the application voltages V2 to V6 are set to values gradually changed within a voltage range of V1 to V7.

Description is made on a case in which the image light ML emitted from the light modulating element 24 is incident on the liquid crystal lens 41 via the image selection conversion member 26 and the like, in other words, a case in which the horizontally polarized light having a polarization plane parallel to the X direction is incident on the liquid crystal lens 41. With regard to the horizontally polarized light, a voltage applied to the electrode 47 that is arranged at the outermost side in the peripheral portion is increased to reduce retardation, and the refractive index is relatively reduced in the region. Thus, for example, in a case of light from a point light source, the light that passes through the liquid crystal lens 41 via the electrode 47 in the peripheral portion has a wavefront that relatively advances. In contrast, a voltage applied to the electrode 47 that is arranged at the innermost side being the center portion is reduced to maintain retardation close to its original state, and the refractive index is relatively increased in the region. Thus, for example, in a case of light from a far point light source, the light that passes through the liquid crystal lens 41 via the electrode 47 in the center portion has a wavefront that is relatively delayed. Thus, image light $ML_O$ in a diverging state which is incident on the liquid crystal lens 41 from an image RI set on a predetermined focal plane FP is horizontally polarized light, and passes through the liquid crystal lens 41 to be subjected to an action as a convex lens and become image light $ML_{PR}$ in a state in which a diverging angle is reduced. Virtual image light $ML_{PI}$ that traces back the image light $ML_{PR}$ is from a virtual image position farther than the focal plane FP. A focal length of the liquid crystal lens 41 is a distance from a point light source to the liquid crystal lens 41 when light from the point light source is collimated. Approximately, with reference to the lens formula, the relationship expressed by $1/F=1/A+1/B$ is satisfied, where a distance from the focal plane FP to the liquid crystal lens 41 is A, a distance from the liquid crystal lens 41 to an image plane is B, and a focal length of the liquid crystal lens 41 is F. Here, the distance B from the focal plane FP to the virtual image position is set to a distance as several times to several tens of times as long as the distance A from the liquid crystal lens 41 to the focal plane FP. The distance ratio corresponds to a magnification ratio of a virtual image. In the above, when a relative ratio of the application voltages V1 to V7 is substantially maintained so that the application voltages are set to be low, a difference in retardation between the center and the periphery decreases, and an absolute value of positive power of the liquid crystal lens 41 decreases. In other words, the absolute value of the power can be increased by applying a high voltage VH to the liquid crystal lens 41, the absolute value of the power can be decreased by applying a low voltage VL to the liquid crystal lens 41, and the drive circuit 41c allows the liquid crystal lens 41 to function as an externally adjustable varifocal lens. The external light OL that passes through the light shielding member 21 and the like is vertically polarized light, and even when the external light OL passes through the liquid crystal lens 41, retardation is maintained uniform in the XY plane regardless of the values of the application voltages V1 to V7. Thus, a phase difference is not imparted, and the external light OL is not affected by a lens action of the liquid crystal lens 41. In other words, the external light OL linearly advances without being substantially affected by the composite display member 20 and the polarization separation lens element 40.

The liquid crystal lens 41 functions as a varifocal lens to change the focal length F. Thus, the distance B from the liquid crystal lens 41 to the image plane position or the virtual image position can freely be changed, and adjustment of a magnification ratio can be performed. Further, even when visual acuity of the wearer US is imbalanced due to nearsightedness or the like, focus adjustment for observing a virtual image while maintaining a focused state can be performed. In other words, the image plane position or the virtual image position can be adjusted finely according to visual acuity of an individual (farsightedness, nearsightedness, astigmatism, or the like). The wearer US can perform adjustment of a magnification ratio or focus adjustment by operating the user terminal 88, for example. In other words, the virtual image display devices 100A and 100B enable customization relating to a magnification ratio and focus by an operation by the wearer US.

The liquid crystal lens 41 has an image formation action with respect to the image light ML being horizontally polarized light or vertically polarized light. The liquid crystal lens 41 may be regarded as a liquid crystal lens including a function as a lens with respect to a specific polarization component, and may also be regarded as a liquid crystal lens having a lens function acting on a specific polarization component. When the liquid crystal lens 41 is arranged in front of the eyes, an eye box having a size close to that of the liquid crystal lens 41 can be secured. The eye box can be increased in size, and chipping of an image is less likely to occur. Moreover, the display optical systems 103a and 103b that are reduced in size and have a large FOV can be achieved at the same time. Moreover, the composite display member 20 including the backlight 22, the polarizing plate 23, the light modulating element 24, the polarizing plate 25, the image selection conversion member 26, and the like and the liquid crystal lens 41 are combined with each other, and thus display on a large screen can be performed with a small-sized optical system. Here, display on a large screen indicates a case in which a virtual image of 70 inches or larger is formed at a distance of 2.5 m ahead, for example.

The liquid crystal lens 41 is not required to be used with variable focus, and may be used with fixed focus. The liquid crystal lens 41 is not limited to one in which retardation is gradually reduced from the center to the periphery, but may also be a Fresnel lens as disclosed, for example, in International Publication WO2009/072670. The liquid crystal lens 41 may change the alignment direction of the liquid crystal by ultrasonic waves.

Figure 8:
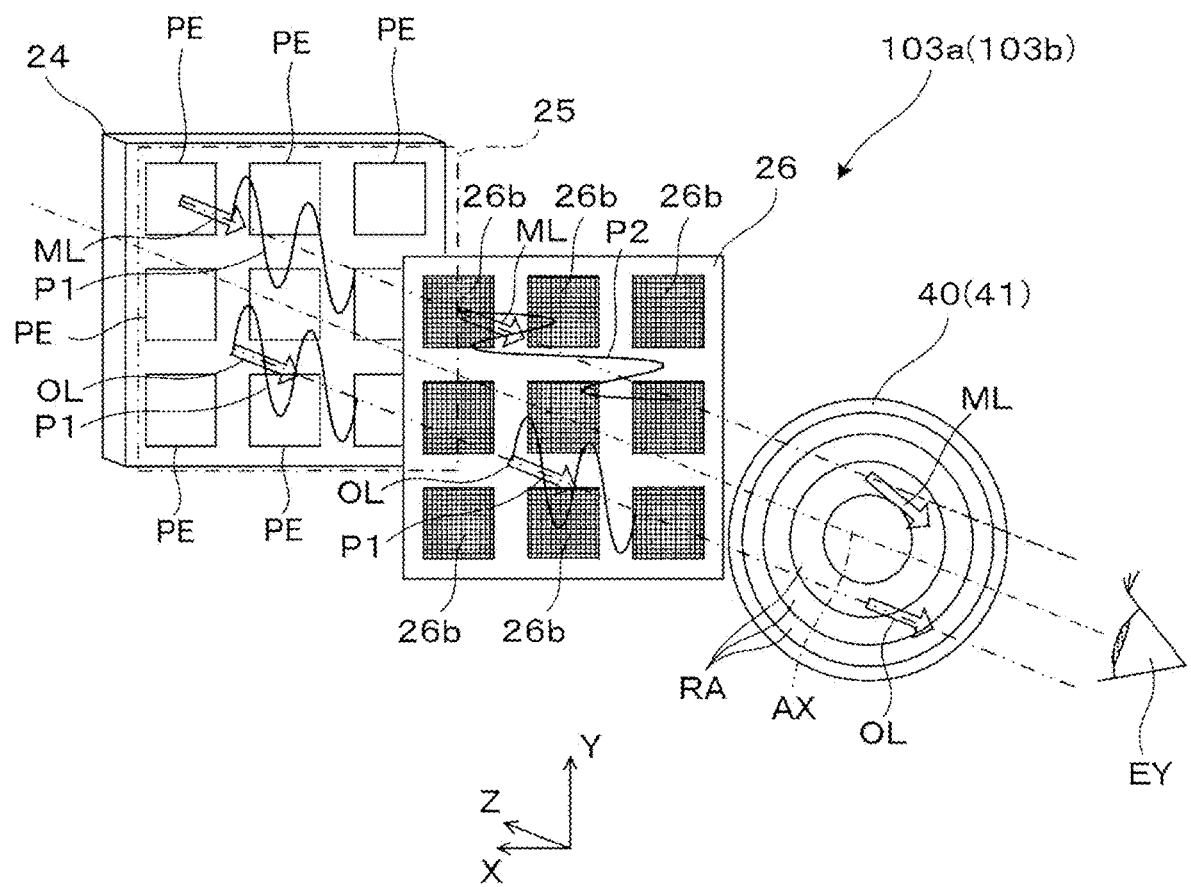
FIG. 8 is a schematic view for describing an operation of the virtual image display device of the first exemplary embodiment.

With reference to FIG. 8, in one exemplary embodiment, the image light ML that is emitted from the liquid crystal pixel PE of the light modulating element 24 is turned into only the vertically polarized light P1 via the polarizing plate 25, is selectively changed from the vertical polarization direction to the horizontal polarization direction via the image selection conversion member 26, and is emitted as the horizontally polarized light P2. The image light ML that passes through the image selection conversion member 26 forms a virtual image via the liquid crystal lens 41 of the polarization separation lens element 40 functioning as a convex lens with respect to the horizontally polarized light.

A virtual image formed with the image light ML is observed by the eyes EY of the wearer. Meanwhile, the external light OL passes through the light transmitting region A1 of the light shielding member 21, passes through the light transmitting region A2 of the backlight 22, passes through the polarizing plate 23 to vertically regulate the polarization direction, passes through the light transmitting region A3 of the light modulating element 24 and the polarizing plate 25, and further passes through the light transmitting region A4 of the image selection conversion member 26, which has a parallel flat plate-like shape. In this state, the external light OL is not subjected to a lens action by the light shielding member 21, the backlight 22, the polarizing plate 23, the light modulating element 24, the polarizing plate 25, and the image selection conversion member 26, and an ordinary external image is observed by the eyes EY of the wearer. In other words, an external image can be recognized in a see-through view via the display optical systems 103a and 103b.

As described above, in a configuration in which the external light OL passes through the liquid crystal layer in the light transmitting region A3 of the light modulating element 24, for example, a configuration in which the entire space between the first base plate 51 and the second base plate 52 is filled with liquid crystal without accommodating the liquid crystal pixel PE in the liquid crystal cell as in FIG. 6, the liquid crystal layer rotates the polarization plane of the external light OL in some cases. As an example, there is given a case in which the light modulating element 24 includes the TN liquid crystal layers in both the light transmitting region A3 and the liquid crystal pixel PE. In such a case, the polarization direction of the polarized light that can be transmitted through the polarizing plate 25 and the polarization direction of the polarized light over which the liquid crystal lens 41 has the refractive power selectively are set so as to match with the rotation of the polarization plane of the external light OL in the light transmitting region A3. The polarization direction of the polarized light that can be transmitted through the polarizing plate 25 is selected so that the external light OL incident on the polarizing plate 25 is not substantially attenuated and the image light ML emitted from the polarizing plate 25 has intensity corresponding to the tone in the liquid crystal pixel PE. For example, when the action of the liquid crystal layer in the light transmitting region A3 converts the external light OL from the vertically polarized light to the horizontally polarized light, the polarizing plate 25 is configured to remove the vertically polarized light component of the incident image light ML and transmit the external light OL and the horizontal component of the image light ML. The polarization direction of the image light ML that is emitted from the polarizing plate 25 is switched to the direction orthogonal to the polarization direction of the external light OL. Then, the image light ML passes through the liquid crystal lens 41 while being subjected to a light condensing action or a lens action, and then is converted into a virtual image of each of the liquid crystal pixels PE.

FIG. 9A and FIG. 9B illustrate an example in which the polarization direction of the polarized light that can be transmitted through the polarizing plate 25 is set depending on the configuration of the light modulating element 24. FIG. 9A and FIG. 9B illustrate a configuration in which the light modulating element 24 includes the liquid crystal layers formed of TN liquid crystal both in the light transmitting region A3 and the liquid crystal pixel PE. Here, FIG. 9A illustrates a state of the liquid crystal pixel PE in a case in which a driving voltage applied to the TN liquid crystal of the liquid crystal pixel PE is a voltage of 0 V. FIG. 9B illustrates a state of the liquid crystal pixel PE in a case in which the maximum driving voltage is applied to the TN liquid crystal of the liquid crystal pixel PE. FIG. 9A and FIG. 9B schematically illustrate orientation of liquid crystal molecules 58 inside the liquid crystal pixel PE. In a state in which a voltage is not applied, the TN liquid crystal rotates the polarization plane by 90 degrees. As the voltage to be applied is increased, the angle of rotation of the polarization plane is 0 degrees. The maximum driving voltage to be applied to the liquid crystal pixel PE is set to such a voltage that the polarization plane is not rotated. Thus, as illustrated in FIG. 9A, when the driving voltage to be applied to the liquid crystal pixel PE is 0 V, rotation of the polarization plane in the liquid crystal pixel PE is 90 degrees. As illustrated in FIG. 9B, when the driving voltage to be applied to the liquid crystal pixel PE is the maximum driving voltage, rotation of the polarization plane is 0 degrees. When a driving voltage between 0 V and the maximum driving voltage is applied to the liquid crystal pixel PE, the polarization plane is rotated in the liquid crystal pixel PE by an angle corresponding to tone of the liquid crystal pixel PE indicated in the image data.

In the configuration illustrated in FIG. 9A and FIG. 9B, the polarization plane of the external light OL is rotated at the time of passage through the light transmitting region A3, and the external light OL is converted from the vertically polarized light P1 into the horizontally polarized light P2. In the exemplary embodiment illustrated in FIG. 9A and FIG. 9B, the polarizing plate 25 is configured to remove the vertically polarized light and transmit the horizontally polarized light P2 so as to match with rotation of the polarization plane of the external light OL in the light transmitting region A3. With this, the external light OL that passes through the polarizing plate 25 is not attenuated. At the same time, the image light ML that is emitted from the polarizing plate 25 has intensity corresponding to the tone in the liquid crystal pixel PE.

In addition, in the configuration illustrated in FIG. 9A and FIG. 9B, with regard to the liquid crystal lens 41, the polarization directions for the lens function are also changed accordingly as the functions of the light modulating element 24 and the polarizing plate 25 are changed. Both the external light OL and the image light ML that are emitted from the polarizing plate 25 are the horizontally polarized light P2. Thus, the image light ML that is emitted from the image selection conversion member 26 configured to selectively rotate only the polarization direction of the image light ML by 90 degrees is the vertically polarized light P1. In view of this, the configuration and/or the operation of the liquid crystal lens 41 is changed to function as a convex lens having the refractive power selectively on the vertically polarized light P1. The material of the liquid crystal layer 45 of the liquid crystal lens 41, the initial orientation state of the liquid crystal layer 45, and/or the application voltages V1 to V7 of the electrode 47 are selected as appropriate. With this, the liquid crystal lens 41 can be configured to have the refractive power selectively on the vertically polarized light P1.

The virtual image display devices 100A and 100B, or the HMD 200 of the first exemplary embodiment described above includes the light modulating element 24, the light shielding member 21, the backlight 22, the polarizing plate 25, the image selection conversion member 26, and the polarization separation lens element 40. The light modulating element 24 includes the liquid crystal pixel PE and the light transmitting region A2. The light shielding member 21 is arranged on the face side of the light modulating element 24, and suppresses incidence of the external light on the liquid crystal pixel PE. The backlight 22 is arranged between the light shielding member 21 and the light modulating element 24, and irradiates the liquid crystal pixel PE with the light of three colors in a time-division manner. The polarizing plate 25 regulates the external light that passes through the light transmitting region A2 of the light modulating element 24 and the image light that is emitted from the liquid crystal pixel PE, to the polarized light in the specific polarization direction, and transmit the light. The image selection conversion member 26 selectively changes the polarization direction of the image light that is emitted from the polarizing plate 25. The polarization separation lens element 40 is arranged on the face side of the image selection conversion member 26, and has the refractive power acting on polarization of the image light.

In the virtual image display devices 100A and 100B, or the HMD 200 described above, the external light that passes through the light shielding member 21 is regulated to the predetermined polarization direction via the light modulating element 24 and the polarizing plate 25, and passes through the polarization separation lens element 40 without being subjected to an action of the refractive power. With this, an external image can be observed. Meanwhile, the backlight light that is generated by the backlight 22 is incident on the liquid crystal pixel PE of the light modulating element 24, the image light ML that is emitted from the liquid crystal pixel PE is regulated to the predetermined polarization direction via the polarizing plate 25, and the polarization direction of the image light ML is converted by the image selection conversion member 26. The image light ML passes through the polarization separation lens element 40 while being subjected to an action of the refractive power. In this manner, a virtual image is formed. In this state, the backlight 22 generates the light of the three colors as the backlight light in a time-division manner, and irradiates the liquid crystal pixel PE. Thus, even when color display is performed, a low resolution of the light modulating element 24, in other words, low density of the liquid crystal pixel PE is allowed. With this, a ratio of the light transmitting region A3 to the light modulating element 24 can be increased, and a see-through transmittance can be improved.

Figure 10:
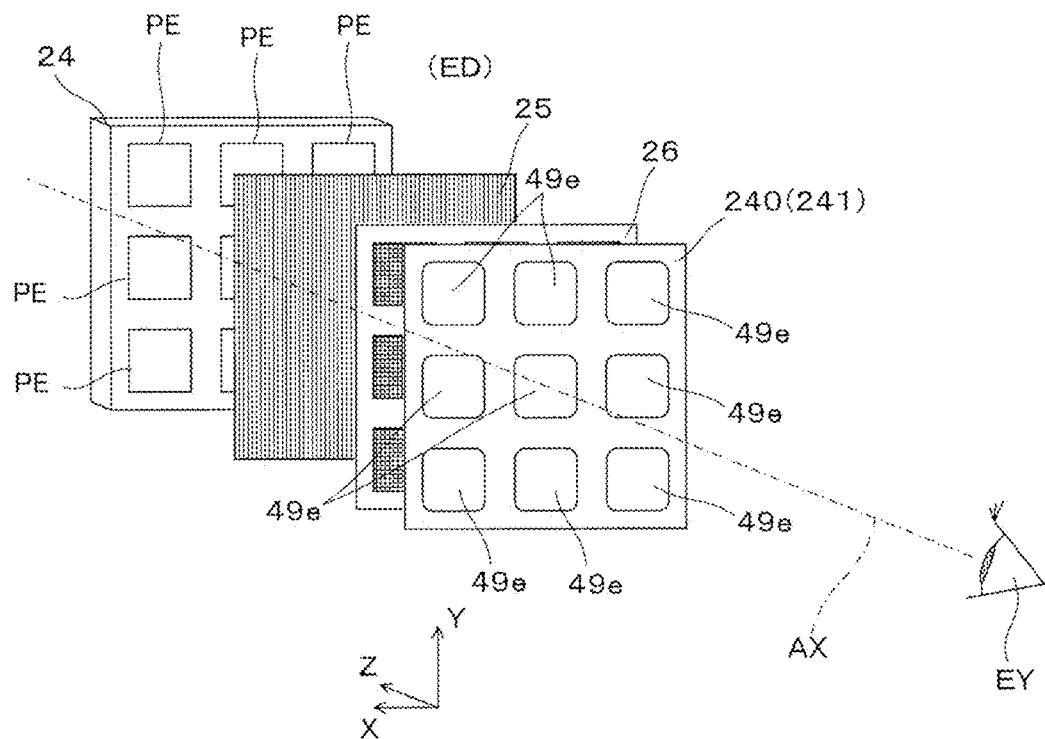
FIG. 10 is a schematic perspective view illustrating a display optical system in a modification example.

FIG. 10 illustrates a modification example of the virtual image display devices 100A and 100B or the HMD 200 of the first exemplary embodiment. In the configuration illustrated in FIG. 10, a polarization separation lens element 240 formed of a micro lens array 241 is arranged in the vicinity of the face side of the composite display member 20, in place of the liquid crystal lens 41. The polarization separation lens element 240 includes a plurality of lens elements 49e that individually refract the image light ML from each of the liquid crystal pixels PE constituting the light modulating element 24. The lens element 49e does not have a refraction action on the external light OL. With this configuration, the virtual image display devices 100A and 100B or the HMD 200 can also be operated. However, in view of enlarging an eye box, a configuration using the liquid crystal lens 41 illustrated in FIG. 2, FIG. 3, FIG. 7, and FIG. 8 is suitably adopted.

Second Exemplary Embodiment

A virtual image display device according to a second exemplary embodiment is described below. The virtual image display device according to the second exemplary embodiment is obtained by partially modifying the virtual image display device according to the first exemplary embodiment, and description of parts in common with those of the virtual image display device according to the first exemplary embodiment is omitted.

Figure 11:
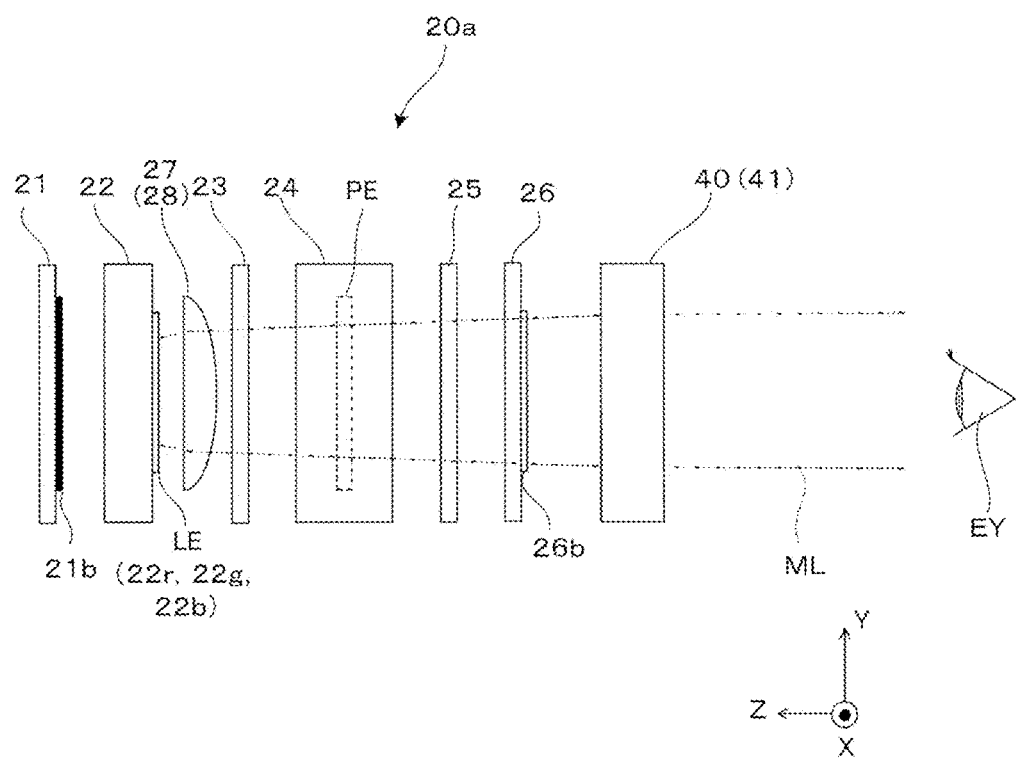
FIG. 11 is a schematic view illustrating a virtual image display device of a second exemplary embodiment.

With reference to FIG. 11, in the virtual image display devices 100A and 100B or the HMD 200 of the second exemplary embodiment, a luminous flux shaping element 27 is arranged on the face side of each of the light emitting units LE of the backlight 22. The luminous flux shaping element 27 reduces a radiation angle of the backlight light emitted from each of the light emitting units LE. When the radiation angle of the backlight light from each of the light emitting units LE is excessively large, it is required to increase the liquid crystal pixel PE according to the distance to the light modulating element 24, and a see-through transmittance may be degraded. By providing the luminous flux shaping element 27 for reducing the radiation angle of the backlight light, the size of the liquid crystal pixel PE can be reduced. In the illustrated exemplary embodiment illustrated in FIG. 11, as the luminous flux shaping element 27, a micro lens 28 for reducing the radiation angle of the backlight light by a refraction action is used. As the luminous flux shaping element 27, a diffraction optical element for reducing the radiation angle of the backlight by a diffraction action, such as a diffraction optical element formed by nano-imprinting, a hologram, and a meta lens may be used in place of the micro lens 28.

Figure 12:
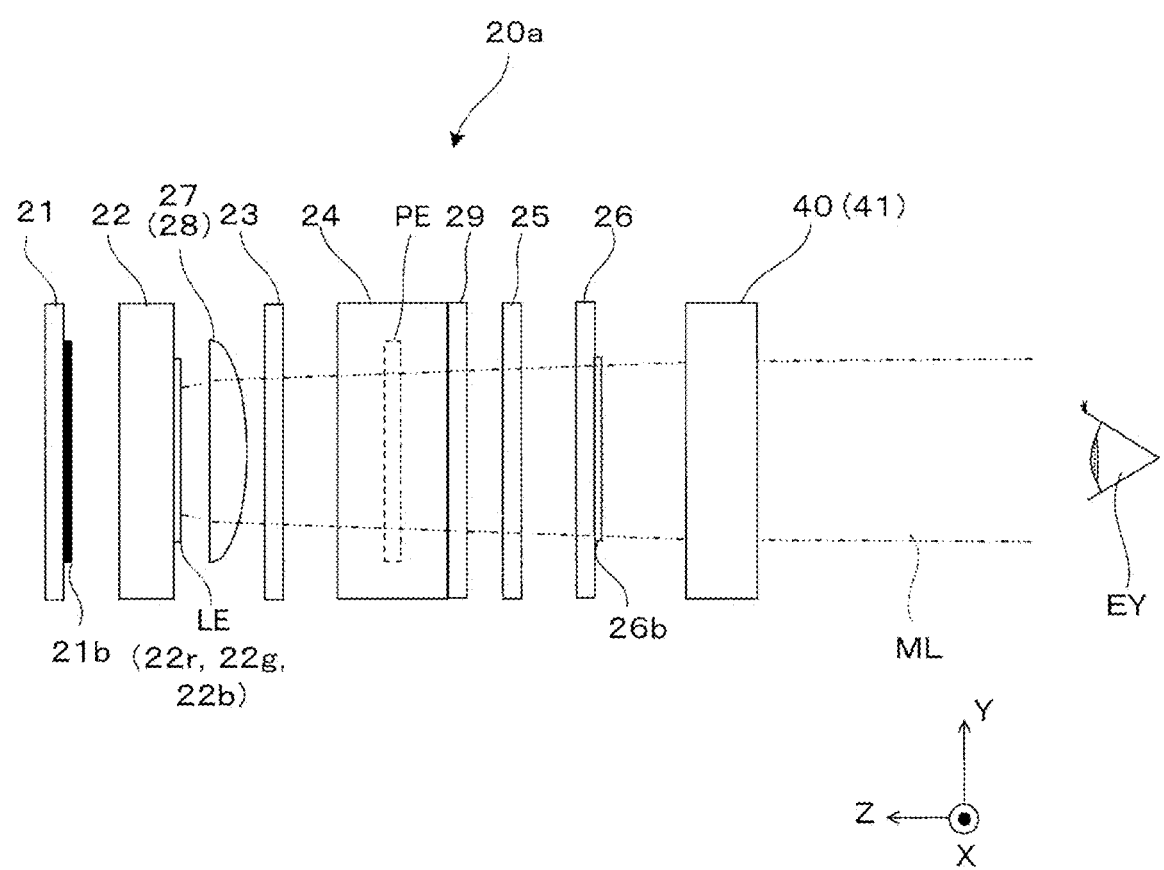
FIG. 12 is a schematic view illustrating a display optical system in a modification example.

As illustrated in FIG. 12, when the luminous flux shaping element 27 is used, a light diffusing element 29 that diffuses the image light ML emitted from the liquid crystal pixel PE may be arranged on the face side of the light modulating element 24. When the luminous flux shaping element 27 narrows the backlight light, the image light ML emitted from the liquid crystal pixel PE may be excessively narrow, and an eye box may be reduced. The light diffusing element 29 is provided to deal with such a situation. By using the light diffusing element 29, the image light ML emitted from the liquid crystal pixel PE is diffused, and an eye box is easily secured. As the light diffusing element 29, a diffusing plate may be used. Alternatively, a diffraction optical element by nano-imprinting or a diffraction element such as a hologram and a meta lens may be used.

MODIFICATION EXAMPLES AND OTHERS

Although the present disclosure has been described with reference to the above-described exemplary embodiments, the present disclosure is not limited to the above-described exemplary embodiments and can be implemented in various modes without departing from the spirit of the disclosure. For example, the following modifications are possible. In the exemplary embodiment described above, the liquid crystal lens 41 is not limited to one including the electrode as an element, and may be one having refractive power by filling a space between a Fresnel lens-like first base plate and a flat plate-like second base plate with liquid crystal and aligning the alignment of the liquid crystal with a Fresnel lens surface. The liquid crystal lens 41 is not limited to one including the ring-like orbicular zone RA, and various structures having a lens action with respect to specific polarized light may be adopted. Further, the liquid crystal lens 41 may include an elongated circular electrode that is slightly elongated in a specific direction, instead of a circular electrode.

Although it has been assumed above that the HMD 200 is worn on the head and is used, the virtual image display devices 100A and 100B may also be used as a hand-held display that is not worn on the head and is to be looked into like binoculars. In other words, the head-mounted display also includes a hand-held display in the present disclosure.

According to a specific aspect, a virtual image display device includes a light modulating element including a liquid crystal pixel and a first light transmitting region having light transmittance, a light shielding member being arranged on an external side of the light modulating element and being configured to suppress incidence of external light on the liquid crystal pixel, a backlight being arranged between the light shielding member and the light modulating element and being configured to irradiate the liquid crystal pixel with light of three colors in a time-division manner, a polarizing plate configured to limit external light that passes through the first light transmitting region of the light modulating element and image light that is emitted from the liquid crystal pixel, to polarized light in a first polarization direction, and transmit the light, an image selection conversion member configured to selectively change a polarization direction of the image light emitted from the polarizing plate, and a polarization separation lens element being arranged on the face side of the image selection conversion member and having refractive power acting on polarization of the image light.

In the virtual image display device described above, the external light is regulated in the first polarization direction via the polarizing plate, and passes through the polarization separation lens element without being subjected to an action of the refractive power. Meanwhile, the image light emitted from the liquid crystal pixel of the light modulating element is regulated in the first polarization direction via the polarizing plate, the polarization direction of the image light is converted by the image selection conversion member, and the image light passes through the polarization separation lens element while being subjected to an action of the refractive power. With this, a virtual image is formed. In this state, the backlight irradiates the liquid crystal pixel with the light of three colors in a time-division manner. Thus, even when color display is performed, a low resolution of the light modulating element, in other words, low density of the liquid crystal pixels is allowed. With this, a ratio of the first light transmitting region to the light modulating element can be increased, and a see-through transmittance can be improved.

In the virtual image display device according to the specific aspect, the liquid crystal pixels are arranged two-dimensionally, and the backlight includes a light emitting unit that is arranged two-dimensionally at a position corresponding to the liquid crystal pixel and is configured to irradiate the liquid crystal pixel corresponding thereto with the light of three colors in a time-division manner. With this configuration, the light emitting unit can be provided close to the liquid crystal pixel. While the liquid crystal pixel of the light modulating element is irradiated with the light of three colors, and incidence of the generated light of three colors on the first light transmitting region through which the external light is transmitted can be suppressed.

In the virtual image display device according to the specific aspect, the liquid crystal pixels are arranged two-dimensionally, and the light shielding member includes a light shielding layer that is arranged two dimensionally at a position corresponding to the liquid crystal pixel. The light shielding layer can prevent the external light incident at the position to enter the path of the image light and become stray light.

In the virtual image display device according to the specific aspect, the liquid crystal pixels are arranged two-dimensionally, and the image selection conversion member includes a wavelength plate that is arranged two-dimensionally at a position corresponding to the liquid crystal pixel. With this, while suppressing an influence on the external light, the polarization direction of the image light emitted from the liquid crystal pixel can selectively be converted.

In the virtual image display device according to the specific aspect, the image selection conversion member converts the image light passing through the polarizing plate into polarized light in a second polarization direction orthogonal to the first polarization direction. With this, interference between the image light and the external light can be suppressed.

In the virtual image display device according to the specific aspect, the polarization separation lens element is a liquid crystal lens. When the liquid crystal lens is used, an eye box can easily be enlarged.

In the virtual image display device according to the specific aspect, the light shielding member, the backlight, the polarizing plate, and the image selection conversion member are integrated to form a composite display member, and the liquid crystal lens is arranged away from the composite display member. With this configuration, the distance between the composite display member and the liquid crystal lens is secured, and thus an eye box can be expanded.

In the virtual image display device according to the specific aspect, the backlight includes a light emitting element that generates the light of three colors with which the liquid crystal pixel is irradiated and a second light transmitting region that has light transmittance. With this configuration, the external light is transmitted through the second light transmitting region, and thus see-through display can be performed.

In the virtual image display device according to the specific aspect, there is provided a luminous flux shaping element being arranged on a face side of the backlight and being configured to reduce a radiation angle of the light of three colors. With this configuration, even when the radiation angle of the light emitted from the backlight is large, the size of the liquid crystal pixel can be reduced. A micro lens is given as one example of the luminous flux shaping element.

In the virtual image display device according to the specific aspect, when the luminous flux shaping element is used, a light diffusing element configured to diffuse the image light emitted from the liquid crystal pixel of the light modulating element is further provided. With this configuration, a luminous flux of the image light is excessively narrowed by using the luminous flux shaping element, an eye box can be secured.

According to a specific aspect, a head-mounted display apparatus includes a first device including the virtual image display device described above, a second device including the virtual image display device described above, and a support device configured to support the first device and the second device and be worn on a head.

What is claimed is:

1. A virtual image display device, comprising:
   a light modulating element including a liquid crystal pixel and a first light transmitting region having light transmittance;
   a light shielding member being arranged on an external side of the light modulating element and being configured to suppress incidence of external light on the liquid crystal pixel;

a backlight being arranged between the light shielding member and the light modulating element and being configured to irradiate the liquid crystal pixel with light of three colors in a time-division manner;

a polarizing plate configured to limit external light that passes through the first light transmitting region of the light modulating element and image light that is emitted from the liquid crystal pixel, to polarized light in a first polarization direction, and transmit the light;

an image selection conversion member configured to selectively change a polarization direction of the image light emitted from the polarizing plate; and a polarization separation lens element being arranged on a face side of the image selection conversion member and having refractive power acting on polarization of the image light.

2. The virtual image display device according to claim 1, wherein the liquid crystal pixels are arranged two-dimensionally, and the backlight includes light emitting units that are arranged two-dimensionally at positions corresponding to the liquid crystal pixels and are configured to irradiate the liquid crystal pixels corresponding thereto with the light of three colors in a time-division manner.

3. The virtual image display device according to claim 1, wherein the liquid crystal pixels are arranged two-dimensionally, and the light shielding member includes light shielding layers that are arranged two dimensionally at positions corresponding to the liquid crystal pixels.

4. The virtual image display device according to claim 1, wherein the liquid crystal pixels are arranged two-dimensionally, and the image selection conversion member includes wavelength plates that are arranged two-dimensionally at positions corresponding to the liquid crystal pixels.

5. The virtual image display device according to claim 1, wherein the image selection conversion member converts the image light passing through the polarizing plate into polarized light in a second polarization direction orthogonal to the first polarization direction.

6. The virtual image display device according to claim 1, wherein the polarization separation lens element is a liquid crystal lens.

7. The virtual image display device according to claim 6, wherein the light shielding member, the backlight, the polarizing plate, and the image selection conversion member are integrated to form a composite display member, and the liquid crystal lens is arranged away from the composite display member.

8. The virtual image display device according to claim 1, wherein the backlight includes a light emitting element configured to generate the light of three colors and a second light transmitting region having light transmittance.

9. The virtual image display device according to claim 1, comprising:

a luminous flux shaping element being arranged on a face side of the backlight and being configured to reduce a radiation angle of the light of three colors.

10. The virtual image display device according to claim 9, wherein the luminous flux shaping element includes a micro lens.

11. The virtual image display device according to claim 9, comprising:

a light diffusing element configured to diffuse the image light emitted from the liquid crystal pixel of the light modulating element.

12. A head-mounted display apparatus, comprising:

a first device including the virtual image display device according to claim 1;

a second device including the virtual image display device according to claim 1; and a support device including a temple configured to support the first device and the second device so that the first device and the second are wearable on a head.

* * * * *